(12) United States Patent
Park et al.

(10) Patent No.: US 12,712,953 B2
(45) Date of Patent: Aug. 18, 2026

(54) ELECTRONIC DEVICE INCLUDING MAGNET ASSEMBLY

(71) Applicant: Samsung Electronics Co., Ltd., Suwon-si (KR)

(72) Inventors: Junghyung Park, Suwon-si (KR); Yongyoun Kim, Suwon-si (KR); Chanhee Oh, Suwon-si (KR); Jeonggoo Jeon, Suwon-si (KR); Seunggoo Kang, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/653,331

(22) Filed: May 2, 2024

(65) Prior Publication Data

US 2024/0340364 A1 Oct. 10, 2024

Related U.S. Application Data

(63) Continuation of application No. PCT/KR2024/004291, filed on Apr. 3, 2024.

(30) Foreign Application Priority Data

Apr. 10, 2023 (KR) ........................ 10-2023-0047080
Jun. 23, 2023 (KR) ........................ 10-2023-0081045

(51) Int. Cl.
*H04M 1/02* (2006.01)

(52) U.S. Cl.
CPC ...... *H04M 1/0216* (2013.01); *H04M 2201/08* (2013.01); *H04M 2201/38* (2013.01)

(58) Field of Classification Search
CPC ........... H04M 1/0216; H04M 2201/08; H04M 2201/38; H04M 1/02; G06F 1/16; H01F 7/02
See application file for complete search history.

(56) References Cited

U.S. PATENT DOCUMENTS 10,394,277 B2 8/2019 Kim et al.
11,783,978 B2 * 10/2023 Tazbaz .................. G06F 1/1681 361/807

(Continued)

FOREIGN PATENT DOCUMENTS

CN 212785434 U 3/2021
CN 215072508 U 12/2021

(Continued)

OTHER PUBLICATIONS

International Search Report with Written Opinion and English translation dated Jul. 9, 2024; International Appln. No. PCT/KR2024/004291.

*Primary Examiner* — Matthew D. Anderson
(74) *Attorney, Agent, or Firm* — Jefferson IP Law, LLP

(57) ABSTRACT

An electronic device is provided that includes a first housing, a second housing connected to the first housing to be rotatable about a folding axis, a display disposed on a front surface of the electronic device, a first magnet arranged in the first housing, and a second magnet arranged in the second housing not to correspond to the first magnet while the electronic device is in a folded state, wherein there is an attractive force between the first magnet and the second magnet, wherein the first magnet includes a first boundary surface that partitions different poles and is tilted at a first angle with respect to the folding axis, wherein the second magnet includes a second boundary surface that partitions different poles and is tilted at a second angle with respect to the folding axis, and wherein the first boundary surface and the second boundary surface face each other.

20 Claims, 27 Drawing Sheets

(56) References Cited

U.S. PATENT DOCUMENTS

| | | | |
|---|---|---|---|
| 2009/0243775 | A1 | 10/2009 | Kim |
| 2016/0070306 | A1 | 3/2016 | Shin et al. |
| 2016/0275648 | A1 | 9/2016 | Honda et al. |
| 2017/0012661 | A1 | 1/2017 | Smith et al. |
| 2020/0267861 | A1 | 8/2020 | Kim |
| 2023/0105902 | A1 | 4/2023 | Kang et al. |
| 2023/0140971 | A1 | 5/2023 | Park et al. |

FOREIGN PATENT DOCUMENTS

| | | | | |
|---|---|---|---|---|
| EP | 2326064 | A1 * | 5/2011 | .......... H04M 1/0216 |
| EP | 4 270 424 | A1 | 11/2023 | |
| EP | 4 307 080 | A1 | 1/2024 | |
| JP | 2015-119470 | A | 6/2015 | |
| JP | 2016-534449 | A | 11/2016 | |
| JP | 6367049 | B2 | 8/2018 | |
| KR | 10-0660564 | B1 | 12/2006 | |
| KR | 10-2016-0029538 | A | 3/2016 | |
| KR | 10-2016-0030571 | A | 3/2016 | |
| KR | 10-2018-0127757 | A | 11/2018 | |
| KR | 10-2020-0101791 | A | 8/2020 | |
| KR | 10-2022-0009856 | A | 1/2022 | |
| KR | 10-2022-0105563 | A | 7/2022 | |
| KR | 10-2022-0133621 | A | 10/2022 | |
| KR | 10-2022-0163703 | A | 12/2022 | |

* cited by examiner

| θ1 | |
|---|---|
| ANGLE | ATTRACTIVE FORCE |
| 0 | 0.301 |
| 5 | 0.305 |
| 10 | 0.307 |
| 15 | 0.31 |
| 20 | 0.311 |
| 25 | 0.31 |
| 30 | 0.31 |
| 35 | 0.306 |
| 40 | 0.303 |

| $\theta 2$ | |
|---|---|
| ANGLE | ATTRACTIVE FORCE |
| 0 | 0.297 |
| 5 | 0.302 |
| 10 | 0.308 |
| 15 | 0.311 |
| 20 | 0.314 |
| 25 | 0.319 |
| 30 | 0.325 |
| 35 | 0.322 |
| 40 | 0.316 |

| $\theta 3$ | |
|---|---|
| ANGLE | ATTRACTIVE FORCE |
| 50 | 0.309 |
| 55 | 0.319 |
| 60 | 0.327 |
| 65 | 0.331 |
| 70 | 0.341 |
| 75 | 0.34 |
| 80 | 0.337 |
| 85 | 0.326 |
| 90 | 0.311 |

| $\theta 1$ | |
|---|---|
| ANGLE | ATTRACTIVE FORCE |
| 0 | 0.308 |
| 5 | 0.312 |
| 10 | 0.315 |
| 15 | 0.319 |
| 20 | 0.322 |
| 25 | 0.324 |
| 30 | 0.326 |
| 35 | 0.322 |
| 40 | 0.318 |

| θ2 | |
|---|---|
| ANGLE | ATTRACTIVE FORCE |
| 0 | 0.301 |
| 5 | 0.305 |
| 10 | 0.312 |
| 15 | 0.316 |
| 20 | 0.32 |
| 25 | 0.324 |
| 30 | 0.325 |
| 35 | 0.321 |
| 40 | 0.316 |

| $\theta 3$ | |
|---|---|
| ANGLE | ATTRACTIVE FORCE |
| 50 | 0.312 |
| 55 | 0.323 |
| 60 | 0.331 |
| 65 | 0.335 |
| 70 | 0.346 |
| 75 | 0.342 |
| 80 | 0.34 |
| 85 | 0.331 |
| 90 | 0.321 |

| $\theta 4$ | |
|---|---|
| ANGLE | ATTRACTIVE FORCE |
| 50 | 0.301 |
| 55 | 0.304 |
| 60 | 0.307 |
| 65 | 0.315 |
| 70 | 0.317 |
| 75 | 0.324 |
| 80 | 0.321 |
| 85 | 0.316 |
| 90 | 0.311 |

ELECTRONIC DEVICE INCLUDING MAGNET ASSEMBLY

CROSS-REFERENCE TO RELATED APPLICATION(S)

This application is a continuation application, claiming priority under § 365(c), of an International application No. PCT/KR2024/004291, filed on Apr. 3, 2024, which is based on and claims the benefit of a Korean patent application number 10-2023-0047080, filed on Apr. 10, 2023, in the Korean Intellectual Property Office, and of a Korean patent application number 10-2023-0081045, filed on Jun. 23, 2023, in the Korean Intellectual Property Office, the disclosure of each of which is incorporated by reference herein in its entirety.

TECHNICAL FIELD

The disclosure relates to an electronic device including a magnet assembly.

BACKGROUND ART

As more information is visually displayed and electronic devices support more functions, the number of users who want a larger screen display is increasing. New types of electronic devices are also being developed to provide large screen displays while maintaining a portable size.

With the development of display technology, it has become possible to implement foldable displays. Electronic devices in which such displays are used so that an area capable of displaying information is variable by folding are also being released.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A foldable electronic device may include two housings that are coupled to each other via a hinge device to implement a folding or unfolding operation. The foldable electronic device may have magnets arranged to maintain the state of the foldable electronic device when the foldable electronic device is in a fully folded state. The magnets arranged in respective housings are arranged such that different polarities thereof face each other when the electronic device is in the folded state, so that there is an attractive force between the magnets. Accordingly, the foldable electronic device is able to maintain its folded state by the magnets. As the magnets arranged in respective housings are arranged to more accurately correspond to each other, the attractive force between the magnets may increase.

Meanwhile, since various electronic components are placed inside the electronic device, the sizes of the magnets capable of being arranged inside the electronic device may be limited. In addition, due to various electronic components placed inside the electronic device, the magnets arranged in each housing may not face each other or may only partially face each other when the electronic device is in the folded state. Accordingly, the intensity of the attractive force between magnets is reduced, allowing the electronic device to be unfolded from the folded state regardless of a user's intention.

Aspects of the disclosure are to address at least the above-mentioned problems and/or disadvantages and to provide at least the advantages described below. Accordingly, an aspect of the disclosure is to provide an electronic device including a magnet assembly to increase the intensity of the attractive force between the magnets even when the magnets arranged in respective housings do not correspond to each other when the electronic device is folded.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a first housing, a second housing connected to the first housing to be rotatable about a folding axis, a display disposed on a front surface of the electronic device and having a partial area of the display deformed by rotation of the second housing relative to the first housing, a first magnet arranged in the first housing, and a second magnet arranged in the second housing not to correspond to the first magnet while the electronic device is in a folded state, wherein there is an attractive force between the first magnet and the second magnet while the electronic device is in the folded state, wherein the first magnet may include a first boundary surface that partitions different poles and is tilted at a first angle with respect to the folding axis, wherein the second magnet may include a second boundary surface that partitions different poles and is tilted at a second angle with respect to the folding axis, and wherein the first boundary surface and the second boundary surface face each other while the electronic device is in the folded state.

In accordance with another aspect of the disclosure, a magnet assembly, which is arranged in an electronic device in which a first housing and a second housing are connected to each other to be rotatable about a folding axis is provided. The magnet assembly includes a first magnet arranged in the first housing, and a second magnet arranged in the second housing not to correspond to the first magnet while the electronic device is in a folded state, wherein there is an attractive force between the first magnet and the second magnet while the electronic device is in the folded state, wherein the first magnet may include a first boundary surface that partitions different poles and is tilted at a first angle with respect to the folding axis, wherein the second magnet may include a second boundary surface that partitions different poles and is tilted at a second angle with respect to the folding axis, and wherein the first boundary surface and the second boundary surface face each other while the electronic device is in the folded state.

Advantageous Effects of Invention

According to an embodiment of the disclosure, when the magnets arranged in respective housings are spaced apart from each other when the electronic device is in the folded state, the intensity of the attractive force between the magnets can be secured at a predetermined level.

For example, when the magnets placed in respective housings are arranged to be partially correspond to each other, the boundary surfaces dividing the N and S poles of respective magnets are formed to face each other, so that the intensity of the attractive force between the magnets can be increased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1A:
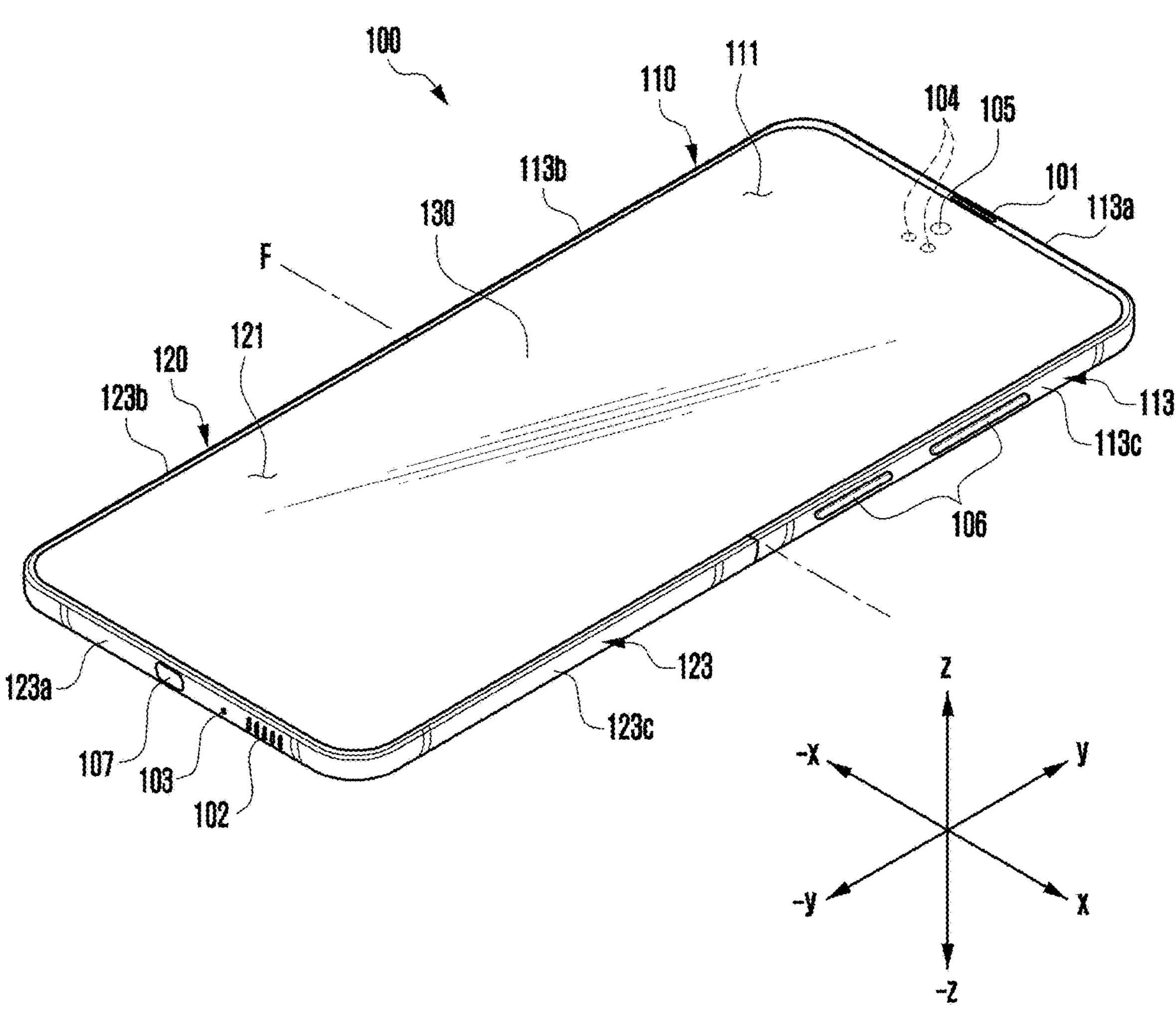
FIG. 1A is a front perspective view illustrating an electronic device in an unfolded or flat state according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that a singular forms "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1B:
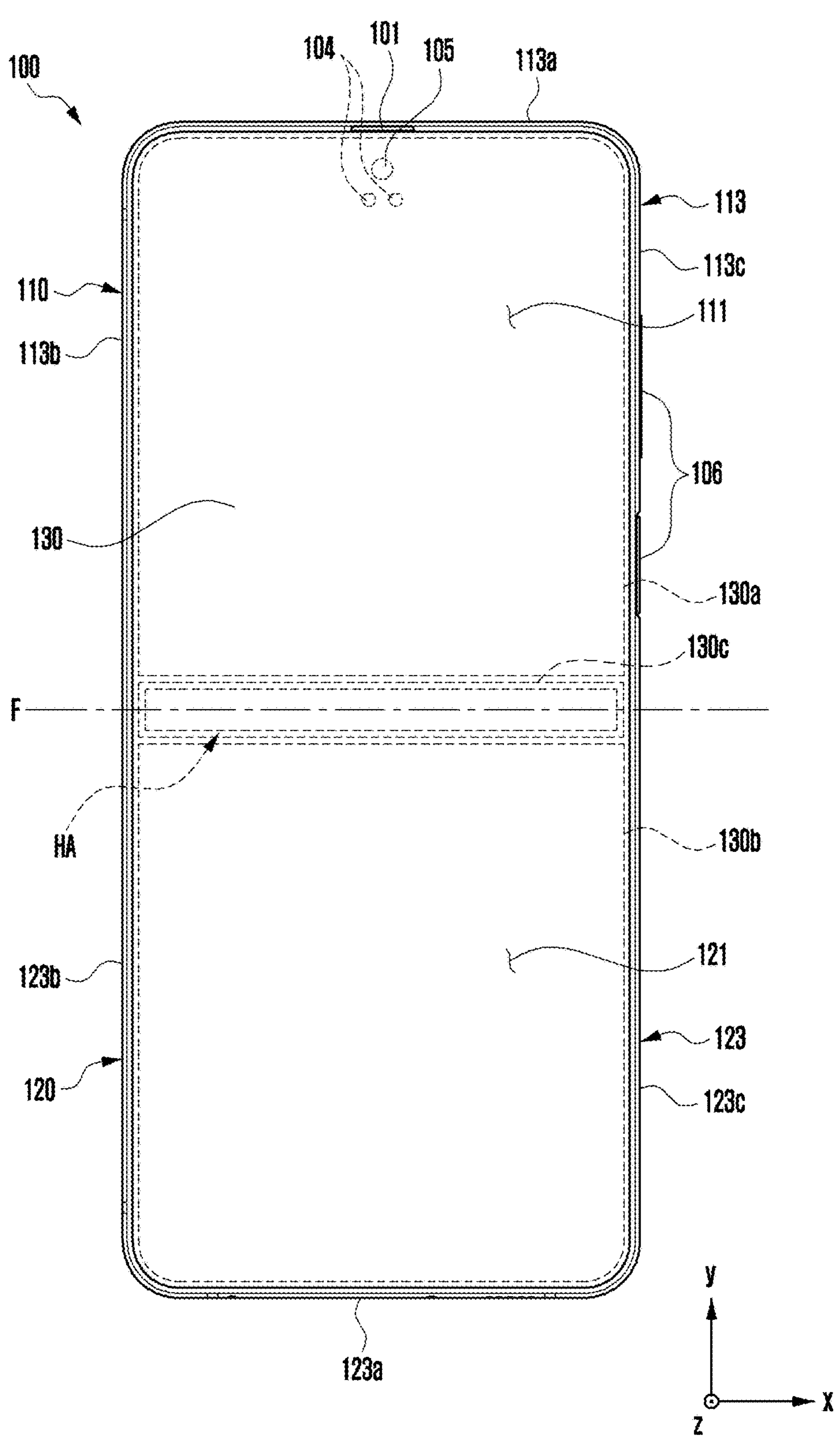
FIG. 1B is a plan view illustrating the front surface of the foldable electronic device in the unfolded state according to an embodiment of the disclosure.
Figure 1C:
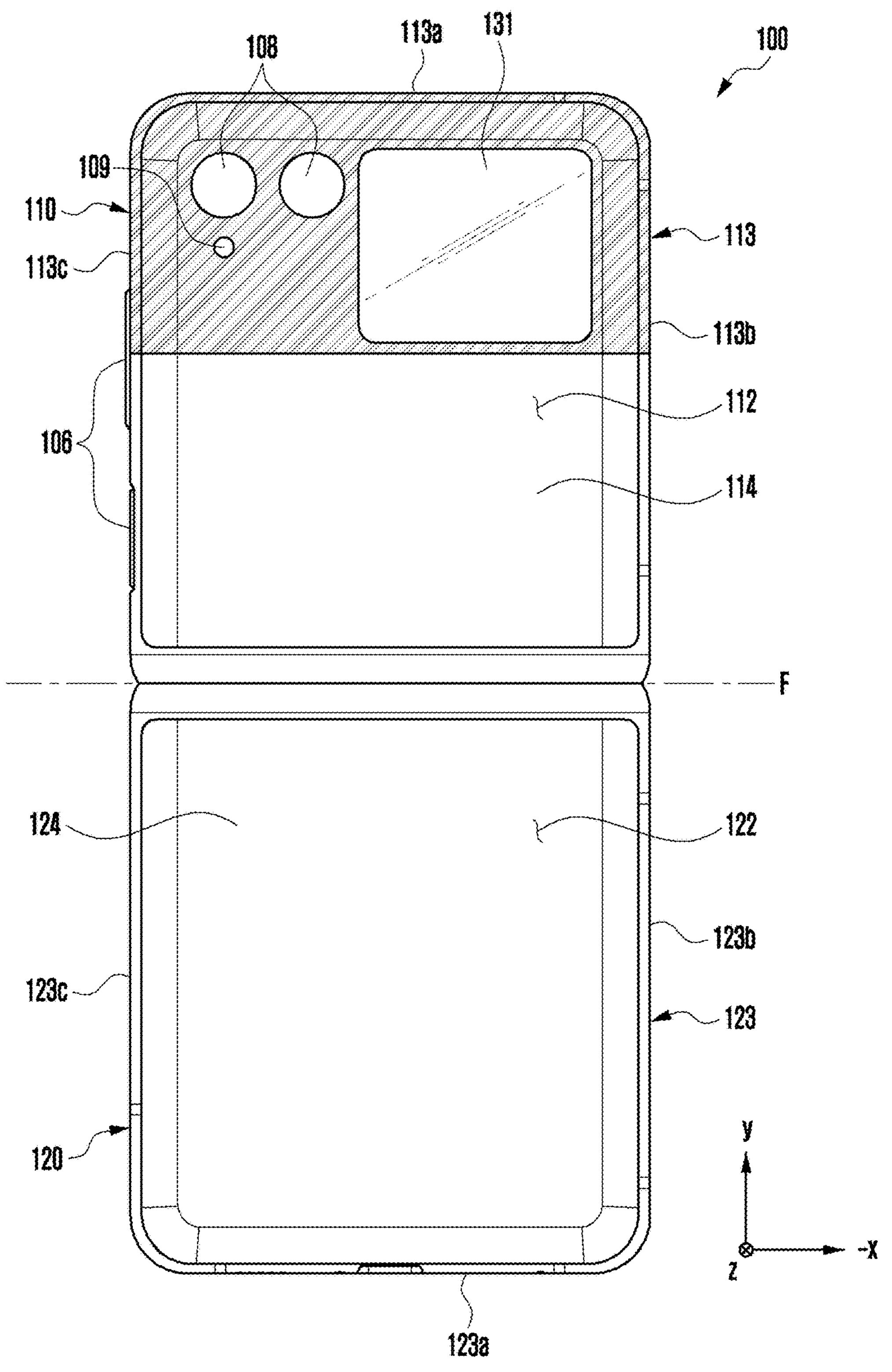
FIG. 1C is a plan view illustrating the rear surface of the foldable electronic device in the unfolded state according to an embodiment of the disclosure.

FIG. 1A is a perspective view illustrating an electronic device in an unfolded or flat state according to an embodiment of the disclosure. FIG. 1B is a plan view illustrating the front surface of the foldable electronic device in the unfolded state according to an embodiment of the disclosure. FIG. 1C is a plan view illustrating the rear surface of the foldable electronic device in the unfolded state according to an embodiment of the disclosure.

Figure 2A:
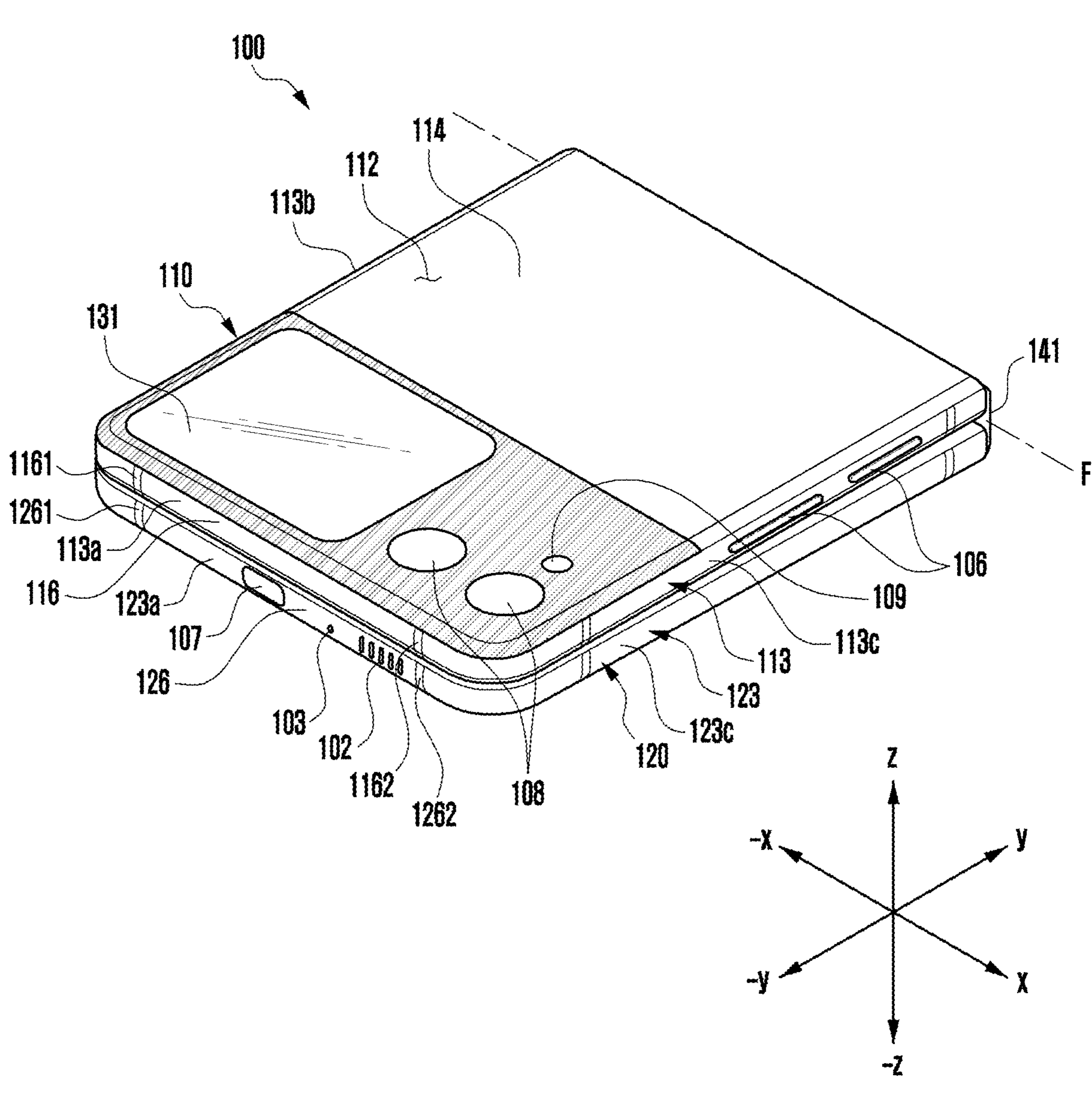
FIG. 2A is a perspective view illustrating the electronic device in the folded state according to an embodiment of the disclosure.
Figure 2B:
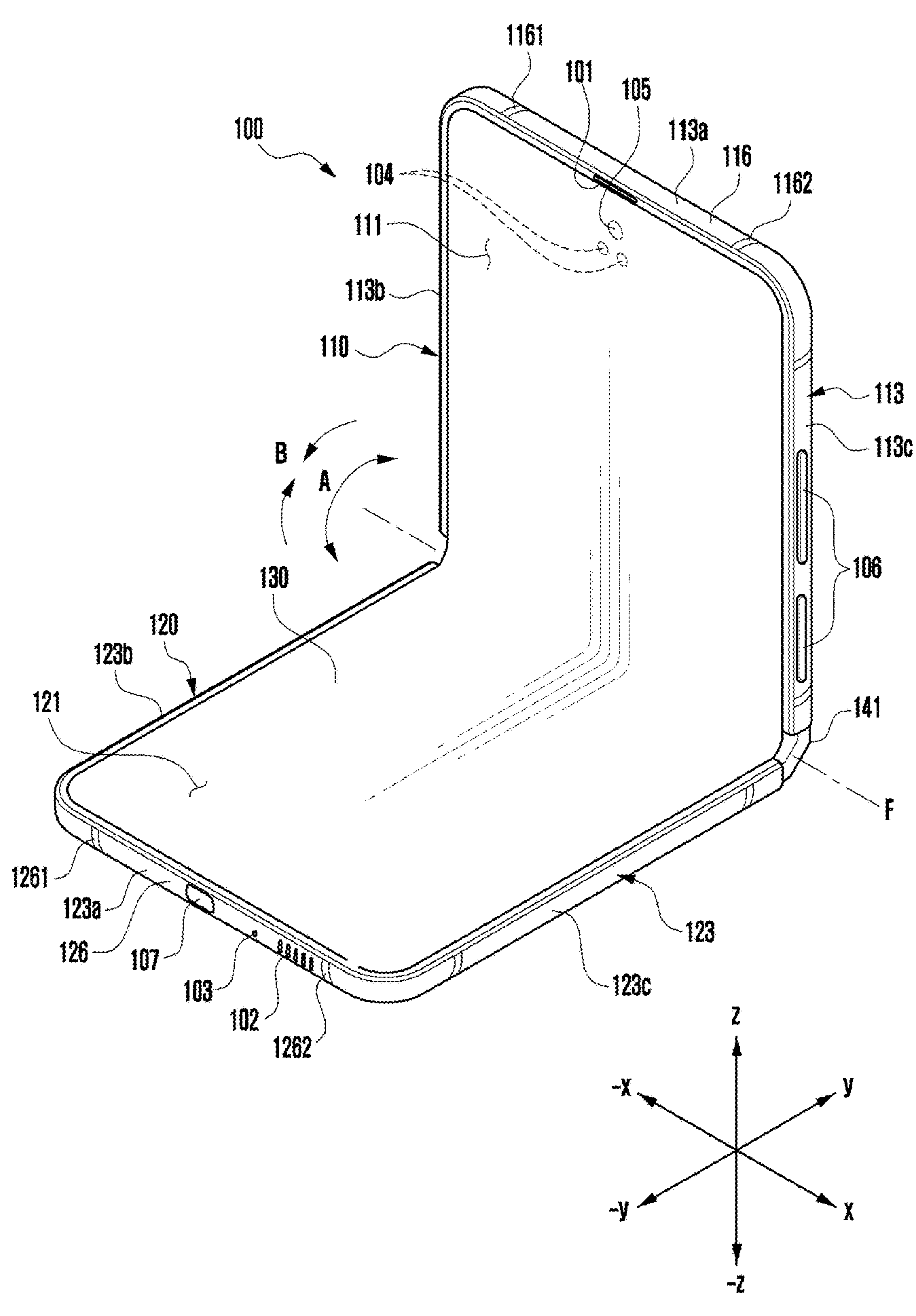
FIG. 2B is a perspective view illustrating the electronic device in an intermediate state according to an embodiment of the disclosure.

FIG. 2A is a perspective view illustrating the electronic device in a folded state according to an embodiment of the disclosure. FIG. 2B is a perspective view illustrating the electronic device in an intermediate state according to an embodiment of the disclosure.

Referring to FIGS. 1A to 1C, 2A, and 2B, the electronic device 100 may include first and second housings 110 and 120 (e.g., a foldable housing structure) that are foldably coupled to each other with respect to a hinge device (e.g., the hinge device HA in FIG. 1B). In an embodiment, the hinge device (e.g., the hinge module HA in FIG. 1B) may be disposed in the X-axis direction or the Y-axis direction. In an embodiment, the electronic device 100 may include a first display 130 (e.g., a flexible display, a foldable display, or a main display) disposed in an area (e.g., a recess) defined by the first and second housings 110 and 120. In an embodiment, the first housing 110 and the second housing 120 may be disposed on opposite sides of a folding axis F and may have shapes that are substantially symmetrical to each other with respect to the folding axis F. In an embodiment, the angle or distance between the first housing 110 and the second housing 120 may vary depending on the state of the electronic device 100. For example, the angle or distance between the first housing 110 and the second housing 120 depending on whether the electronic device is in the flat or unfolded state, the folded state, or the intermediate state.

In an embodiment, the first housing 110 may include, when the electronic device 100 is in the unfolded state, a first surface 111 facing a first direction (e.g., the front direction) (the z-axis direction) and a second surface 112 facing a second direction (e.g., the rear direction) (the −z-axis direction) opposite to the first surface 111. In an embodiment, the second housing 120 may include, when the electronic device 100 is in the unfolded state, a third surface 121 facing the first direction (the z-axis direction) and a fourth surface 122 facing the second direction (the −z-axis direction). In an embodiment, when the electronic device 100 is in the unfolded state, the first surface 111 of the first housing 110 and the third surface 121 of the second housing 120 may face substantially the same first direction (the z-axis direction). In an embodiment, when the electronic device 100 is in the folded state, the first surface 111 of the first housing 110 and the third surface 121 of the second housing 120 may face each other. In an embodiment, when the electronic device 100 is in the unfolded state, the second surface 112 of the first housing 110 and the fourth surface 122 of the second housing 120 may face substantially the same second direction (the −z-axis direction). In an embodiment, when the electronic device 100 is in the folded state, the second surface 112 of the first housing and the fourth surface 122 of the second housing 120 may face opposite directions. For example, when the electronic device 100 is in the folded state, the second surface 112 may face the first direction (the z-axis direction), and the fourth surface 122 may face the second direction (the −z-axis direction). In this case, the first display 130 may be invisible from the outside (in-folding type). In an embodiment, the electronic device 100 may be folded such that the second surface 112 of the first housing 110 and the fourth surface 122 of the second housing 120 face each other. In this case, the first display 130 may be arranged to be visible from the outside (out-folding type).

According to various embodiments, the first housing 110 (e.g., the first housing structure) may include a first side surface member 113 defining at least a portion of the exterior of the electronic device 100, and a first rear surface cover 114 coupled to the first side surface member 113 and defining at least a portion of the second surface 112 of the electronic device 100. In an embodiment, the first side surface member 113 may include a first side surface **113*a*, a second side surface 113*b* extending from one end of the first side surface 113*a*, and a third side surface 113*c* extending from the other end of the first side surface 113*a*. In an embodiment, the first side surface member 113 may have a rectangular (e.g., square or oblong) shape configured with the first side surface 113*a*, the second side surface 113*b*, and the third side surface 113*c***.

According to an embodiment, the second housing 120 (e.g., the second housing structure) may include a second side surface member 123 defining at least a portion of the exterior of the electronic device 100, and a second rear surface cover 124 coupled to the second side surface member 123 and defining at least a portion of the fourth surface 122 of the electronic device 100. In an embodiment, the second side surface member 123 may include a fourth side surface 123*a*, a fifth side surface 123*b* extending from one end of the fourth side surface 123*a*, and a sixth side surface 123*c* extending from the other end of the fourth side surface 123*a*. In an embodiment, the second side surface member 123 may have a rectangular shape configured with the fourth side surface 123*a*, the fifth side surface 123*b*, and the sixth side surface 123*c*.

According to an embodiment, the first and second housing structures 110 and 120 are not limited to the illustrated shape and assembly, but may be implemented by other shapes or other combinations and/or assemblies of components. In an embodiment, the first side surface member 113 and the first rear surface cover 114 may be integrally configured, and the second side surface member 123 and the second rear surface cover 124 may be integrally configured.

According to an embodiment, when the electronic device 100 is in the unfolded state, the second side surface 113*b* of the first side surface member 113 and the fifth side surface 123*b* of the second side surface member 123 may be connected to each other without a gap. In an embodiment, when the electronic device 100 is in the unfolded state, the third side surface 113*c* of the first side surface member 113 and the sixth side surface 123*c* of the second side surface member 123 may be connected to each other without a gap. According to an embodiment, the electronic device 100 may be configured such that, in the unfolded state, the sum of the lengths of the second side surface 113*b* and the fifth side surface 123*b* is greater than the length of the first side surface 113*a* and/or the fourth side surface 123*a*. In an embodiment, the electronic device 100 may be configured such that, in the unfolded state, the sum of the lengths of the third side surface 113*c* and the sixth side surface 123*c* is greater than the length of the first side surface 113*a* and/or the fourth side surface 123*a*.

Referring to FIGS. 2A and 2B, the first side surface member 113 and/or the second side surface member 123 may be made of metal or may further include polymer injected into the metal. In an embodiment, the first side surface member 113 and/or the second side surface member 123 may include at least one conductive portion 116 and/or 126 electrically split from each other through at least one split portion 1161, 1162 and/or 1261, 1262 made of polymer. In this case, the at least one conductive portion 116 and/or 126 may be used as at least a portion of an antenna operating in at least one predetermined band (e.g., a legacy band) by being electrically connected to a wireless communication circuit included in the electronic device 100.

According to an embodiment, the first rear surface cover 114 and the second rear surface cover 124 may be made of at least one of, for example, coated or colored glass, ceramic, polymer, or metal (e.g., aluminum, stainless steel (STS), or magnesium) or a combination of at least two of these materials.

According to an embodiment, the first display 130 may be arranged to extend from the first surface 111 of the first housing 110 to at least a portion of the third surface 121 of the second housing 120 across the hinge device (e.g., the hinge device HA in FIG. 1B). In an embodiment, the first display 130 may include a first area 130*a* substantially corresponding to the first surface 111, a second area 130*b* corresponding to the second surface 112, and a third area 130*c* (e.g., a bendable area or a folding area) that interconnects the first area 130*a* and the second area 130*b*. In an embodiment, the third area 130*c* is a portion of the first area 130*a* and/or the second area 130*b* and is located at a position corresponding to the hinge device (e.g., the hinge device HA in FIG. 1B). In an embodiment, the electronic device 100 may include a hinge housing 141 (e.g., a hinge cover) that supports the hinge device (e.g., the hinge device HA in FIG. 1B). In an embodiment, the hinge housing 141 may be disposed such that when the electronic device 100 is in the folded state, the hinge housing 141 is exposed to the outside, and when the electronic device 100 is in the unfolded state, the hinge housing 141 is invisible from the outside by being introduced into the inner space of the first housing 110 and the inner space of the second housing 120.

According to an embodiment, the electronic device 100 may include a second display 131 (e.g., a sub-display) disposed separately from the first display 130. In an embodiment, the second display 131 may be arranged to be at least partially exposed on the second surface 112 of the first housing 110. In an embodiment, when the electronic device 100 is in the folded state, the second display 131 may at least partially replace the display function of the first display 130 and displays at least part of the status information of the electronic device 100. can do. In an embodiment, the second display 131 may be arranged to be visible from the outside through at least a partial area in the first rear surface cover 114. In an embodiment, the second display 131 may be disposed on the fourth surface 122 of the second housing 120. In this case, the second display 131 may be disposed to be visible from the outside through at least a partial area of the second rear surface cover 124.

According to an embodiment, the electronic device 100 may include at least one of an input device 103 (e.g., a microphone), sound output devices 101 and 102, a sensor module 104, camera devices 105 and 108, key input devices 106, or a connector port 107. In the illustrated embodiment, the input device 103 (e.g., a microphone), the sound output devices 101 and 102, the sensor module 104, the camera device 105 and 108, the key input device 106, or the connector port 107 is illustrated as a hole or a circle-shaped element provided in the first housing 110 or the second housing 120, but this is an illustration for explanation and is not limited thereto.

According to an embodiment, the input device 103 may include at least one microphone 103 disposed in the second housing 120. In an embodiment, the input device 103 may include a plurality of microphones 103 arranged to detect the direction of sound. In an embodiment, the plurality of microphones 103 may be disposed at appropriate positions in the first housing 110 and/or the second housing 120. In an embodiment, the sound output devices 101 and 102 may include one or more speakers 101 and 102. In an embodiment, the one or more speakers 101 and 102 may include a phone call speaker 101 disposed in the first housing 110 and a speaker 102 disposed in the second housing 120. In an embodiment, the input device 103, the sound output devices 101 and 102, and the connector port 107 may be disposed in a space provided in the first housing 110 and/or a space provided in the second housing 120 of the electronic device 100, and may be exposed to the external environment through one or more holes provided in the first housing 110 and/or the second housing 120. In an embodiment, at least one connector port 107 may be used to transmit/receive power and/or data to/from an external electronic device. In an embodiment, the at least one connector port (e.g., an ear jack hole) may accommodate a connector (e.g., an ear jack) for transmitting/receiving an audio signal to/from an external electronic device. In an embodiment, the holes provided in the first housing 110 and/or the second housing 120 may be commonly used for the input device 103 and the sound output devices 101 and 102. In an embodiment, the sound output devices 101 and 102 may include a speaker that is not exposed through the holes provided in the first housing 110 and/or the second housing 120 (e.g., a piezo speaker).

According to an embodiment, the sensor modules 104 may generate electrical signals or data values corresponding to an internal operating state or an external environmental state of the electronic device 100. In an embodiment, the sensor modules 104 may detect an external environment through the first surface 111 of the first housing 110. In an embodiment, the electronic device 100 may further include at least one sensor module arranged to detect an external environment through the second surface 112 of the first housing 110. In an embodiment, the sensor modules 104 (e.g., an illuminance sensor) may be disposed under the flexible display 130 to detect an external environment through the flexible display 130. In an embodiment, the sensor modules 104 may include at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor.

According to an embodiment, the camera devices 105 and 108 may include a first camera device 105 disposed on the first surface 111 of the first housing 110 (e.g., a front camera device) and a second camera device 108 disposed on the second surface 112 of the first housing 110. In an embodiment, the electronic device 100 may further include a flash 109 disposed near the second camera device 108. In an embodiment, the camera devices 105 and 108 may include at least one lens, an image sensor, and/or an image signal processor. In an embodiment, the camera devices 105 and 108 may be arranged such that two or more lenses (e.g., a wide-angle lens, an ultra-wide-angle lens, or a telephoto lens) and two or more image sensors may be located on one surface (e.g., the first surface 111, the second surface 112, the third surface 121, or the fourth surface 122) of the electronic device 100. In an embodiment, the camera devices 105 and 108 may each include time-of-flight (TOF) lenses and/or an image sensor.

According to an embodiment, the key input devices 106 (e.g., key buttons) may be arranged on the third side surface 113*c* of the first side surface member 113 of the first housing 110. In an embodiment, the key input devices 106 may be disposed on at least one of the other side surfaces 113*a* and 113*b* of the first housing 110 and/or the side surfaces 123*a*, 123*b*, and 123*c* of the second housing 120. In an embodiment, the electronic device 100 may not include some or all of the key input devices 106, and the key input devices 106 not included in the electronic device 100 may be implemented in another form such as soft keys on the first display 130. In an embodiment, the key input devices 106 may be implemented by using pressure sensors included in the first display 130.

According to an embodiment, some of the camera devices 105 and 108 (e.g., the first camera device 105) or the sensor modules 104 may be arranged to be exposed through the first display 130. In an embodiment, the first camera device 105 or the sensor modules 104 may be optically exposed to the outside from the inner space of the electronic device 100 through an opening (e.g., a through hole) at least partially provided in the first display 130. In an embodiment, at least some of the sensor modules 104 may be arranged in the internal space of the electronic device 100 not to be visually exposed through the first display 130. Referring to FIG. 2B, the electronic device 100 may operate to maintain at least one predetermined folding angle in the intermediate state via a hinge device (e.g., the hinge device HA in FIG. 1B). In this case, the electronic device 100 may control the first display 130 such that the display area corresponding to the first surface 111 and the display area corresponding to the third surface 121 display different contents, respectively. In an embodiment, with reference to a predetermined folding angle (e.g., the angle between the first housing 110 and the second housing 120 when the electronic device 100 is in the intermediate state), the electronic device 100 may operate to a substantially unfolded state (e.g., the unfolded state in FIG. 1A) and/or a substantially folded state (e.g., the folded state in FIG. 2A) via the hinge device (e.g., the hinge module HA in FIG. 1B). In an embodiment, in the state of being unfolded to a predetermined folding angle via the hinge device (e.g., the hinge device HA in FIG. 1B), when a pressing force is applied in the unfolding direction (the direction A) is provided, the electronic device 100 may be operated to transition to the unfolded state (e.g., the unfolded state in FIG. 1A). In an embodiment, in the state of being unfolded to a predetermined folding angle via the hinge device (e.g., the hinge device HA in FIG. 1B), when a pressing force is applied in the folding direction (the direction B) is provided, the electronic device 100 may be operated to transition to the folded state (e.g., the folded state in FIG. 2A). In an embodiment, the electronic device 100 may be operated to maintain the unfolded state (not illustrated) at various folding angles via the hinge device (e.g., the hinge device HA in FIG. 1B) (free stop function).

Figure 3A:
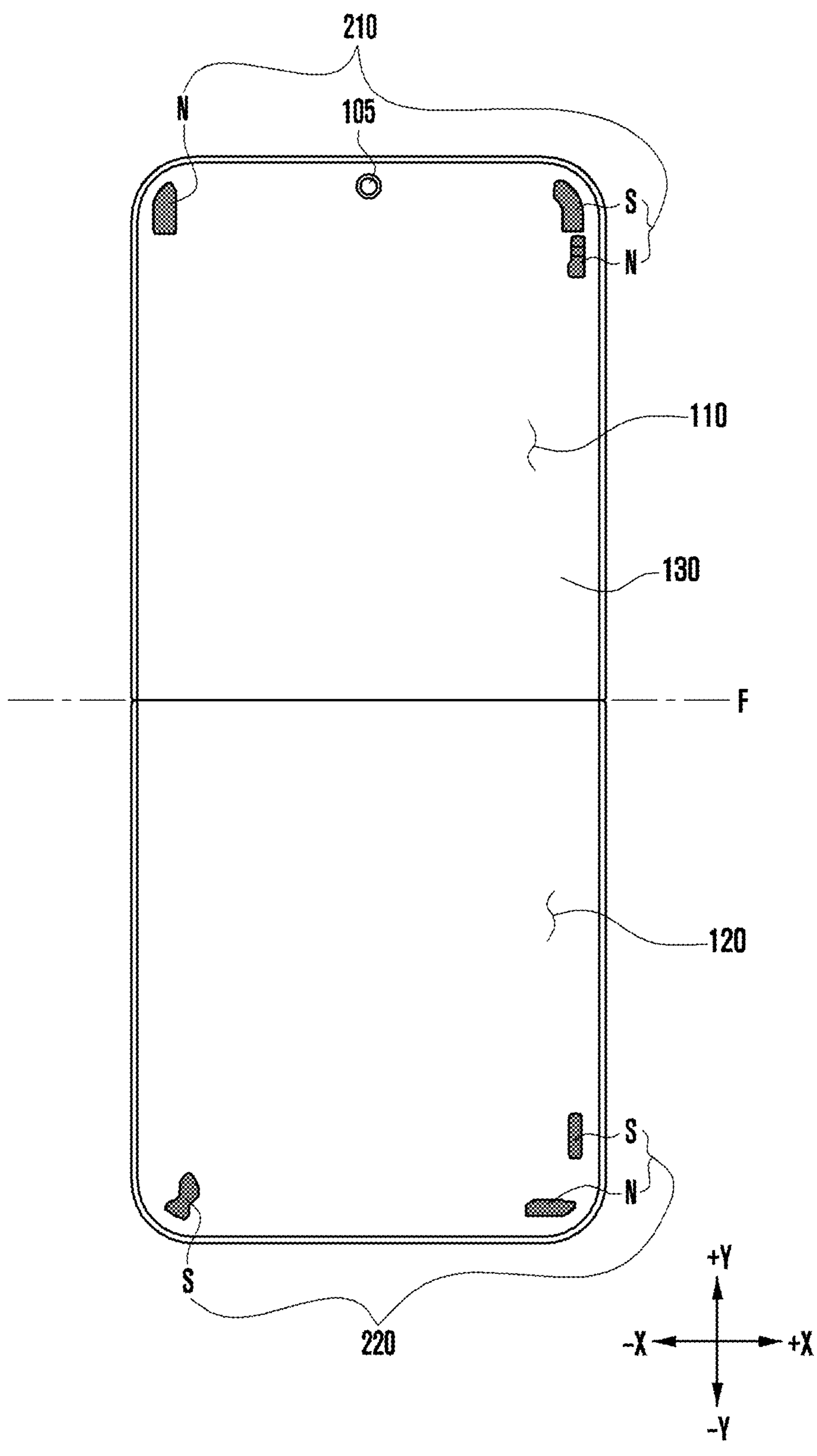
FIG. 3A is a view illustrating a state in which magnets are arranged in the first housing and the second housing, respectively, when the front surface of the electronic device is viewed in the unfolded state according to an embodiment of the disclosure.
Figure 3B:
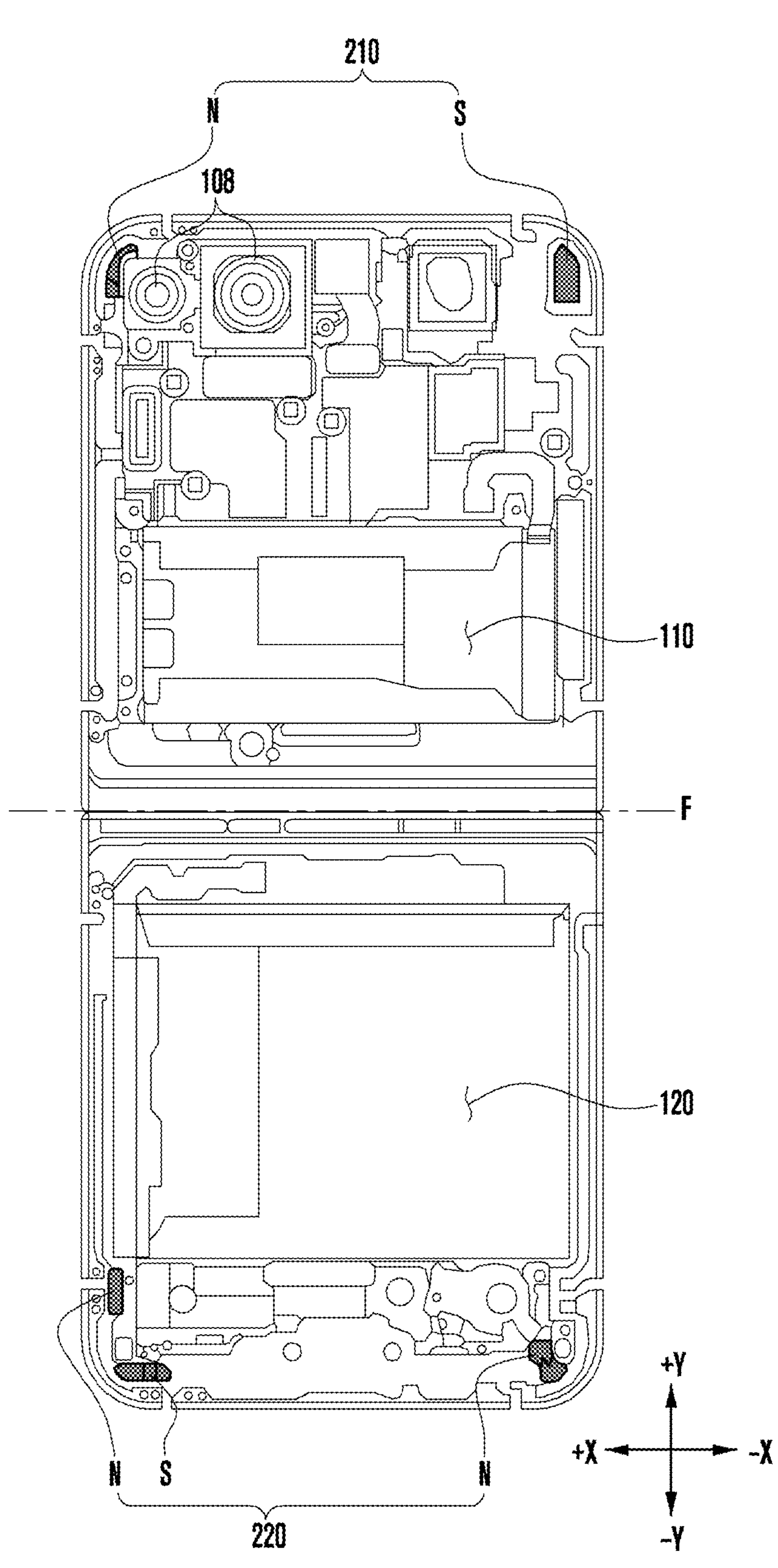
FIG. 3B is a view illustrating a state in which magnets are arranged in the first housing and the second housing, respectively, when the rear surface of the electronic device is viewed in the unfolded state according to an embodiment of the disclosure.
Figure 3C:
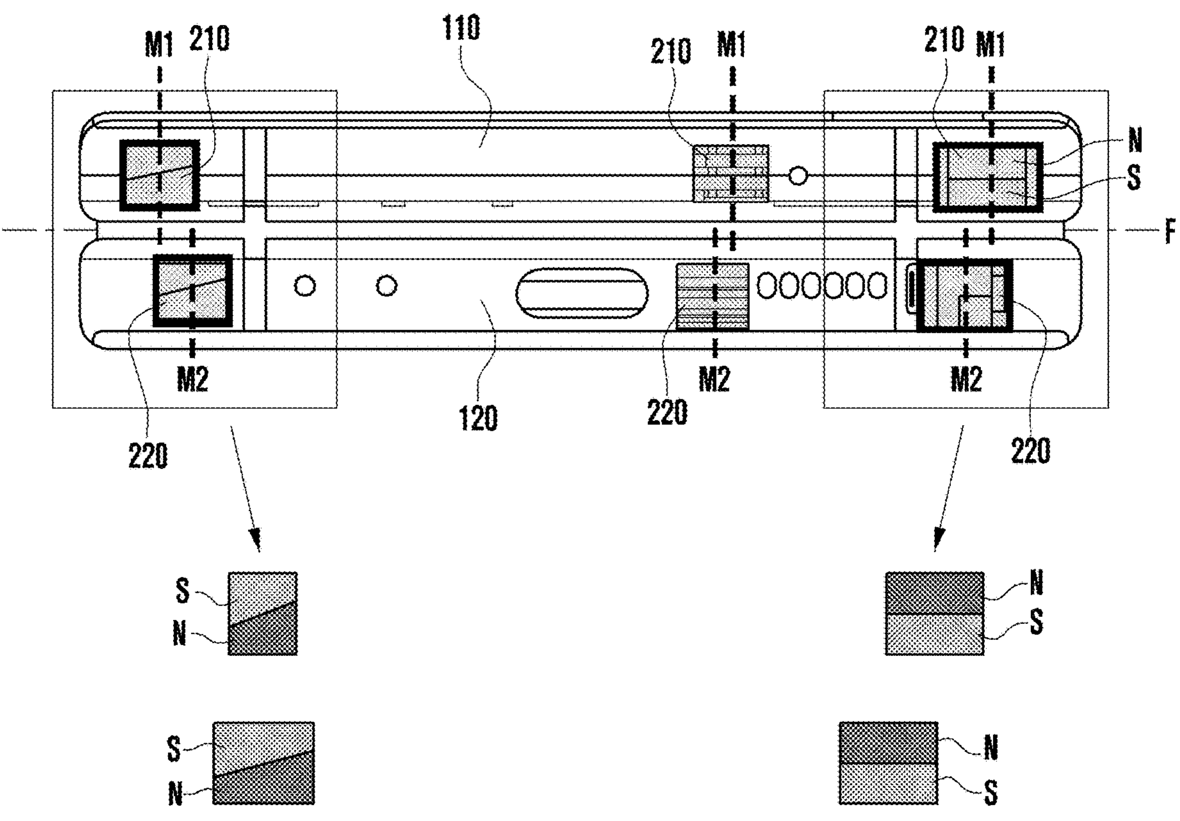
FIG. 3C is a view illustrating a state in which first magnets arranged in the first housing and second magnets arranged in the second housing do not match when the electronic device is folded according to an embodiment of the disclosure.

FIG. 3A is a view illustrating a state in which magnets are arranged in the first housing and the second housing, respectively, when the front surface of the electronic device is viewed in the unfolded state according to an embodiment of the disclosure. FIG. 3B is a view illustrating a state in which magnets are arranged in the first housing and the second housing, respectively, when the rear surface of the electronic device is viewed in the unfolded state according to an embodiment of the disclosure. FIG. 3C is a view illustrating a state in which first magnets arranged in the first housing and second magnets arranged in the second housing do not match when the electronic device is folded according to an embodiment of the disclosure.

According to an embodiment, referring to FIGS. 3A, 3B, and 3C, a plurality of magnets may be arranged in the first housing 110 and the second housing 120. In an embodiment, the electronic device 100 may include a first magnet assembly disposed in the first housing 110 and a second magnet assembly disposed in the second housing 120. In an embodiment, the first magnet assembly may be a general term for magnets arranged in the first housing 110. For example, the first magnet assembly may include first magnets 210 illustrated in FIG. 3A, third magnets 230 illustrated in FIG. 6A, and first magnets 310 (e.g., Halbach magnets) illustrated in FIG. 9A. The second magnet assembly may be a general term for magnets arranged in the second housing 120. For example, the second magnet assembly may include second magnets 220 illustrated in FIG. 3A, fourth magnets 240 illustrated in FIG. 6A, and second magnets 320 (e.g., Halbach magnets) illustrated in FIG. 9A. Hereinafter, the attractive force between the first magnet assembly and the second magnet assembly when the electronic device 100 is folded will be described with reference to the first magnets 210 and the second magnets 220 illustrated in FIGS. 3A and 3B.

In an embodiment, the first magnets 210 and the second magnets 220 may exert an attractive force as the electronic device 100 switches from the unfolded state to the folded state. The electronic device 100 may be maintained in the folded state by the attractive force between the first magnets 210 arranged in the first housing 110 and the second magnets 220 arranged in the second housing 120. In an embodiment, the strength of the attractive force between the first magnets 210 and the second magnets 220 may be greater than the strength of a repulsive force generated since the display 130 is folded when the electronic device 100 is folded.

In an embodiment, referring to FIG. 6A, which will be described later, the electronic device 100 may include a first magnet 210 and a third magnet 230 arranged in the first housing 110 and a second magnet 220 and a fourth magnet 240 arranged in the second housing 120. In an embodiment, the first magnet 210 and the third magnet 230 may be located adjacent to each other, and the second magnet 220 and the fourth magnet 240 may be located adjacent to each other. However, the above description may not limit the number of magnets included in the first housing 110 and the second housing 120. In the electronic device 100, one of the first magnet 210, the second magnet 220, the third magnet 230, and the fourth magnet 240 may be omitted, or another magnet may be further included.

In an embodiment, at least one of a plurality of first magnets 210 may be arranged at an edge of the first housing 110 to be adjacent to the first side surface member 113 disposed on the first housing 110. For example, at least one of the plurality of first magnets 210 may be located at a side surface edge of the first housing 110. At least one of a plurality of second magnets 220 may be arranged at an edge of the second housing 120 to be adjacent to the second side surface member 123 disposed on the second housing 120. For example, at least one of the plurality of second magnets 220 may be located at a side surface edge of the second housing 120. The moment required to maintain the electronic device 100 in the folded state may be the same at any point of the electronic device 100. For example, the moment required to maintain the electronic device 100 in the folded state may be the same at the edges of the electronic device 100 and at the center of the electronic device 100. Accordingly, the first magnets 210 and the second magnets 220 may be arranged adjacent to the side surface members 113 and 123, and may maintain the folded state of the electronic device 100 with an attractive force smaller than that in the case where the magnets are arranged closer to the hinge device HA located in the center of the electronic device 100.

Hereinafter, for convenience of explanation, one of the plurality of first magnets 210 and one of the plurality of second magnets 220 illustrated in FIG. 3A will be described. For example, this may be a description of the relationship between the first magnet 210 and the second magnet 220 located at the outermost positions in the −X direction with reference to FIG. 3A. Alternatively, this may be a description of the relationship between the first magnet 210 and the second magnet 220 located at the outermost positions in the +X direction with reference to FIG. 3A. The following descriptions are equally applicable to the plurality of first magnets 210 disposed in the first housing 110 and the plurality of second magnets 220 disposed in the second housing 120.

In an embodiment, referring to FIGS. 3A and 3B, the first magnet 210 and the second magnet 220 may be arranged such that opposite poles thereof face each other. For example, the N pole of the first magnet 210 may face the display 130, and the S pole of the second magnet 220 may face the display 130. On the contrary, the S pole of the first magnet 210 may face the display 130, and the N pole of the second magnet 220 may face the display 130. The electronic device 100 may maintain the folded state by the attractive force between the first magnet 210 and the second magnet 220.

In an embodiment, the magnet arranged in the first housing 110 and the magnet arranged in the second housing 120 may have various shapes. Referring to FIGS. 3A and 3B, in an embodiment, when the electronic device 100 is folded, the plurality of first magnets 210 and the plurality of second magnets 220, which face each other, may have different shapes. In an embodiment not illustrated in the drawings, the plurality of first magnets 210 and the plurality of second magnets 220 may have the same shape. In addition, in an embodiment, the first magnet 210, the second magnet 220, the third magnet 230, and/or the fourth magnet 240, which will be described later, may have the same shape. In addition, in an embodiment, the first magnet 210, the second magnet 220, the third magnet 230, and/or the fourth magnet 240, which will be described later, may have different shapes.

According to an embodiment, the intensity of a magnetic field generated by a magnet (e.g., the first magnet 210, the second magnet 220, the third magnet 230, and/or the fourth magnet 240) may be proportional to the density of magnetic flux per unit area.

Hereinafter, a virtual axis extending in a direction perpendicular to the display 130 and passing through the N and S poles of the first magnet 210 will be referred to as a first axis C1 (e.g., the first axis C1 in FIG. 3B). In addition, a virtual axis extending in a direction perpendicular to the display 130 and passing through the N and S poles of the second magnet 220 will be referred to as a second axis C2 (e.g., the second axis C2 in FIG. 3B). The above-mentioned first axis C1 and second axis C2 are virtual axes, in which the first axis C1 of the first magnet 210 may be an axis for describing a place where the intensity of a first magnetic field M1 of the first magnet 210 is relatively strong among first, second, and third points in FIGS. 4B and 4C. In addition, the second axis C2 of the second magnet 220 may be an axis for describing a place where a second magnetic field M2 of the second magnet 220 has a relatively strong intensity among fourth, fifth, and sixth points in FIGS. 4B and 4C. For example, referring to FIGS. 4B and 4C, which will be described later, it may be identified that the magnetic field of the first magnet 210 has the strongest magnetic force of 1100 gauss (G) at the second point closest to the first axis C1 among the first point, the second point, and the third point. Similarly, the magnetic force of a second magnetic field M2 generated by the second magnet 220 may become stronger toward the second axis C2. For example, referring to FIGS. 4B and 4C, which will be described later, it may be identified that the magnetic field of the second magnet 220 has the strongest magnetic force of 1100 G at the fifth point among the fourth point, the fifth point, and the sixth point.

In an embodiment, the attractive force between the first magnet 210 and the second magnet 220 may be proportional to the intensity of the magnetic field. For example, as the degree to which the first magnetic field M1 of the first magnet 210 and the second magnetic field M2 of the second magnet 220 overlap is increased, the intensity of the attractive force between the first magnet 210 and the second magnet 220 may increase.

According to an embodiment, as illustrated in FIG. 3B, the first magnet 210 arranged in the first housing 110 and the second magnet 220 arranged in the second housing 120 may be arranged so that the magnets do not correspond to each other when the electronic device 100 is in the folded state. For example, referring to FIG. 3B, the first magnet 210 may partially overlap the second magnet 220 when viewed in a direction perpendicular to the display 130 (e.g., the Z-axis direction with reference to FIG. 2A) when the electronic device 100 is in the folded state. In an embodiment not illustrated in the drawings, the first magnet 210 may not overlap the second magnet 220 when viewed in a direction perpendicular to the display 130 when the electronic device 100 is in the folded state. Accordingly, the intensity of the attractive force between the first magnet 210 and the second magnet 220 may be decreased. In this case, when the electronic device 100 is in the folded state, the electronic device 100 may be unfolded regardless of the user's intention.

In an embodiment, the first magnet 210 and the second magnet 220 may have different shapes and may not correspond to each other when the electronic device 100 is in the folded state. According to an embodiment, various electronic components may be placed inside the electronic device 100. In this case, the space where the first magnet 210 and the second magnet 220 can be arranged inside the first housing 110 and the second housing 120 may be limited. In this case, the first magnet 210 and the second magnet 220 may have different shapes, and may be arranged such that the magnets do not face each other or only partially face each other when the electronic device 100 is in the folded state. Alternatively, even when the first magnet 210 and the second magnet 220 have the same shape, the space where the magnets can be arranged inside the first housing 110 and the second housing 120 is limited, so the first magnet 210 and the second magnet 220 may be arranged not to correspond to each other. Accordingly, the intensity of the attractive force between the first magnet 210 and the second magnet 220 may be decreased. In this case, when the electronic device 100 is in the folded state, the electronic device 100 may be unfolded regardless of the user's intention.

According to an embodiment of the disclosure, the intensity of the attractive force between the first magnet 210 and the second magnet 220, which are arranged not to correspond to each other when the electronic device 100 is in the folded state, may increase. For example, a boundary surface that partitions the N and S poles of the first magnet 210 (e.g., the first boundary surface 211 in FIG. 4B) and a boundary surface that partitions the N and S poles of the second magnet 220 (e.g., the second boundary surface 221 FIG. 4B) are arranged to face each other so that the intensity of the attractive force between the first magnet 210 and the second magnet 220 may increase. A detailed description will be provided below.

Figure 4A:
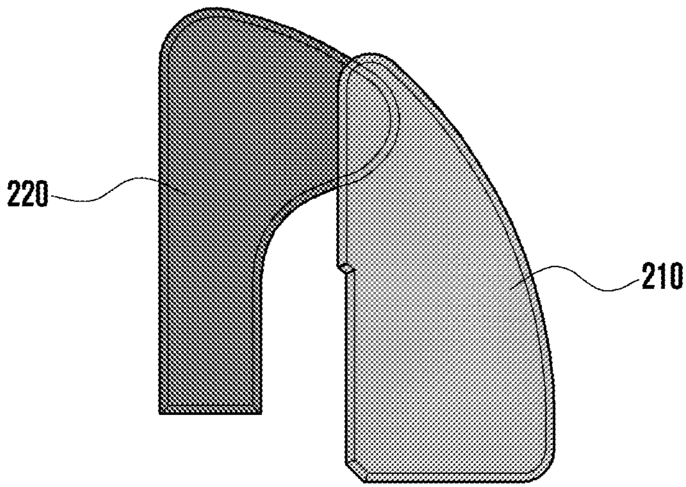
FIG. 4A is a view illustrating a state in which a first magnet arranged in the first housing and a second magnet arranged in the second housing are arranged not to correspond to each other with respect to the folding axis according to an embodiment of the disclosure.
Figure 4B:
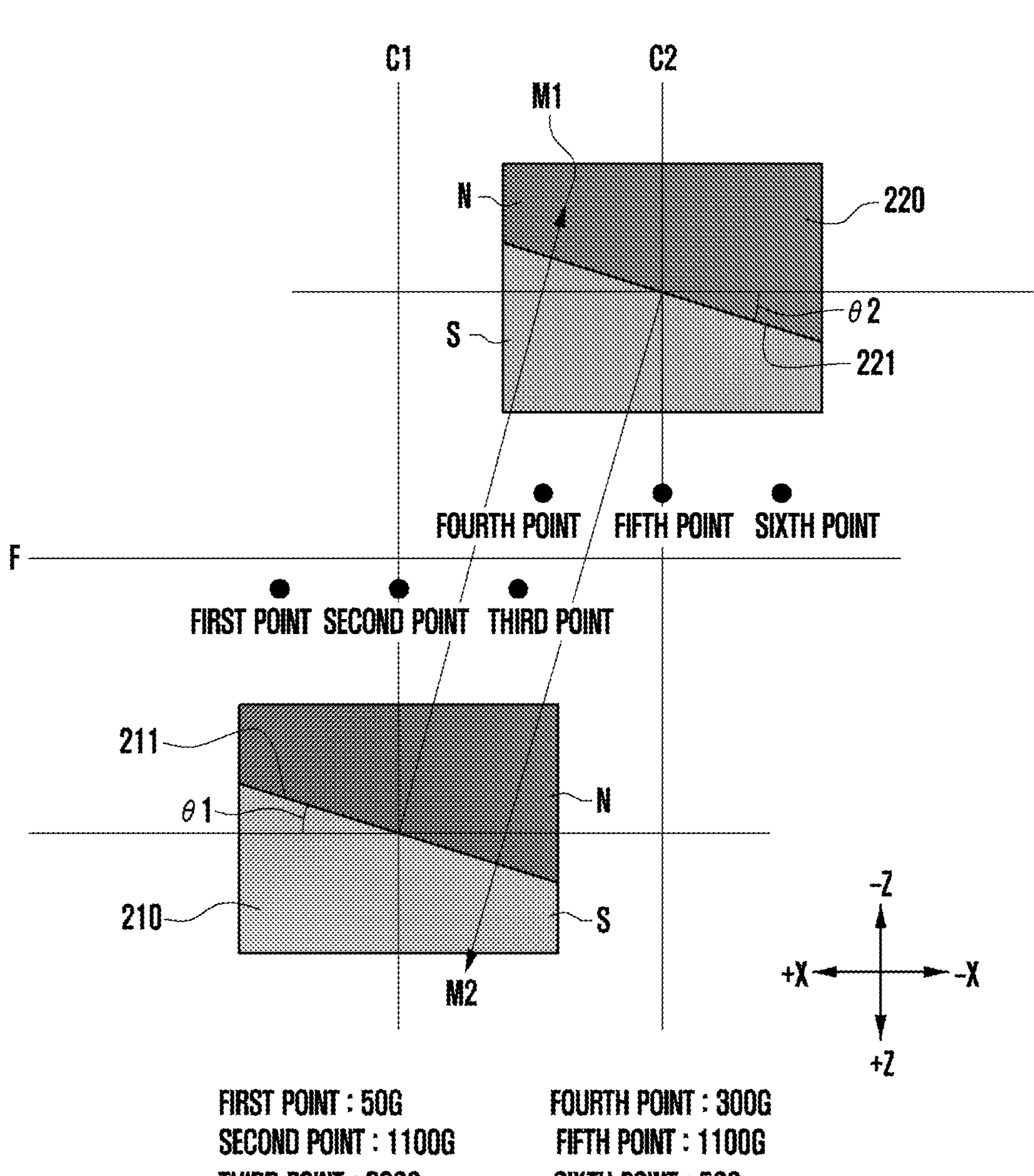
FIG. 4B is a view illustrating an attractive force between the first magnet and the second magnet depending on the angles at which the first boundary surface of the first magnet and the second boundary surface of the second magnet, which are illustrated in FIG. 4A are tilted with respect to the folding axis according to an embodiment of the disclosure.
Figure 4C:
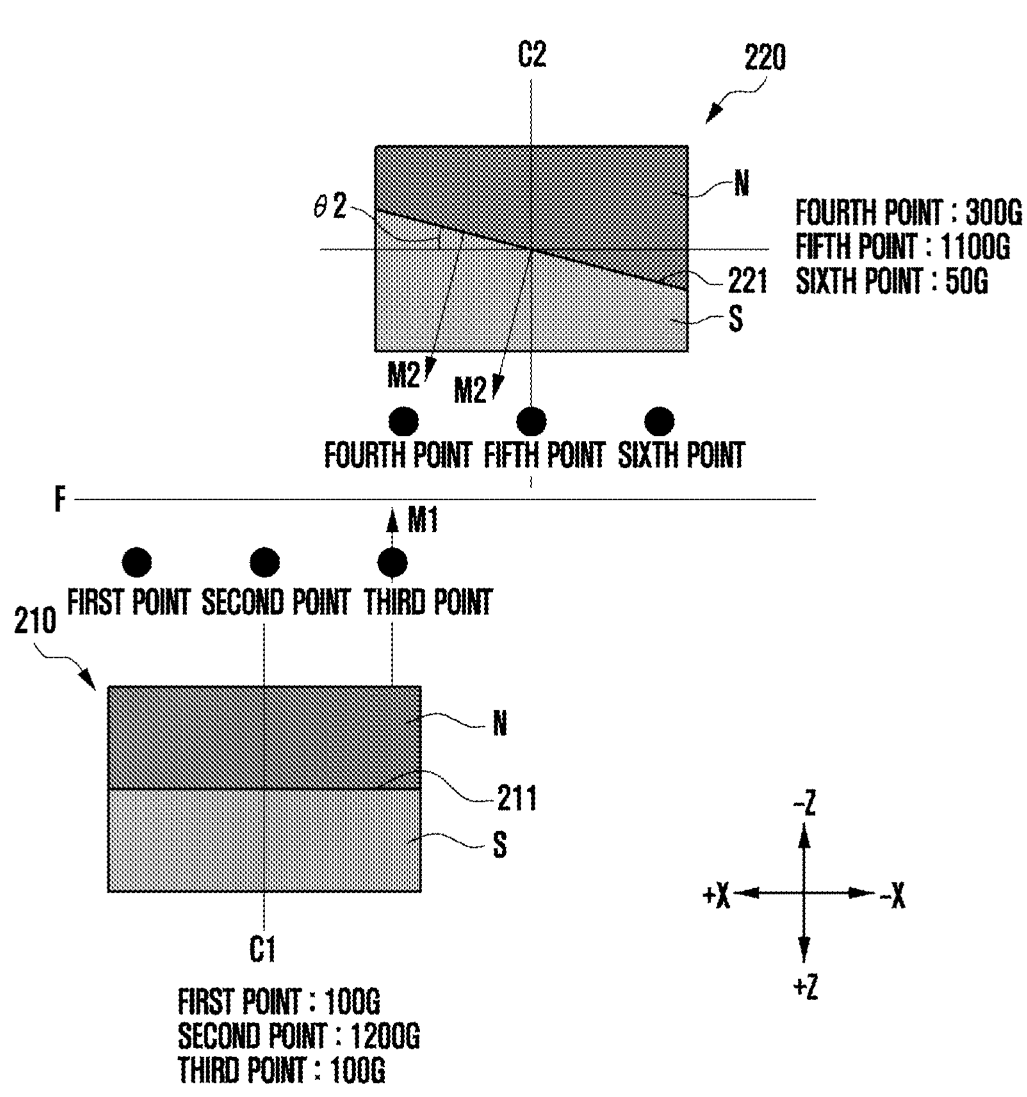
FIG. 4C is a view illustrating an embodiment in which the first boundary surface of the first magnet is parallel to the folding axis according to an embodiment of the disclosure.
Figure 4D:
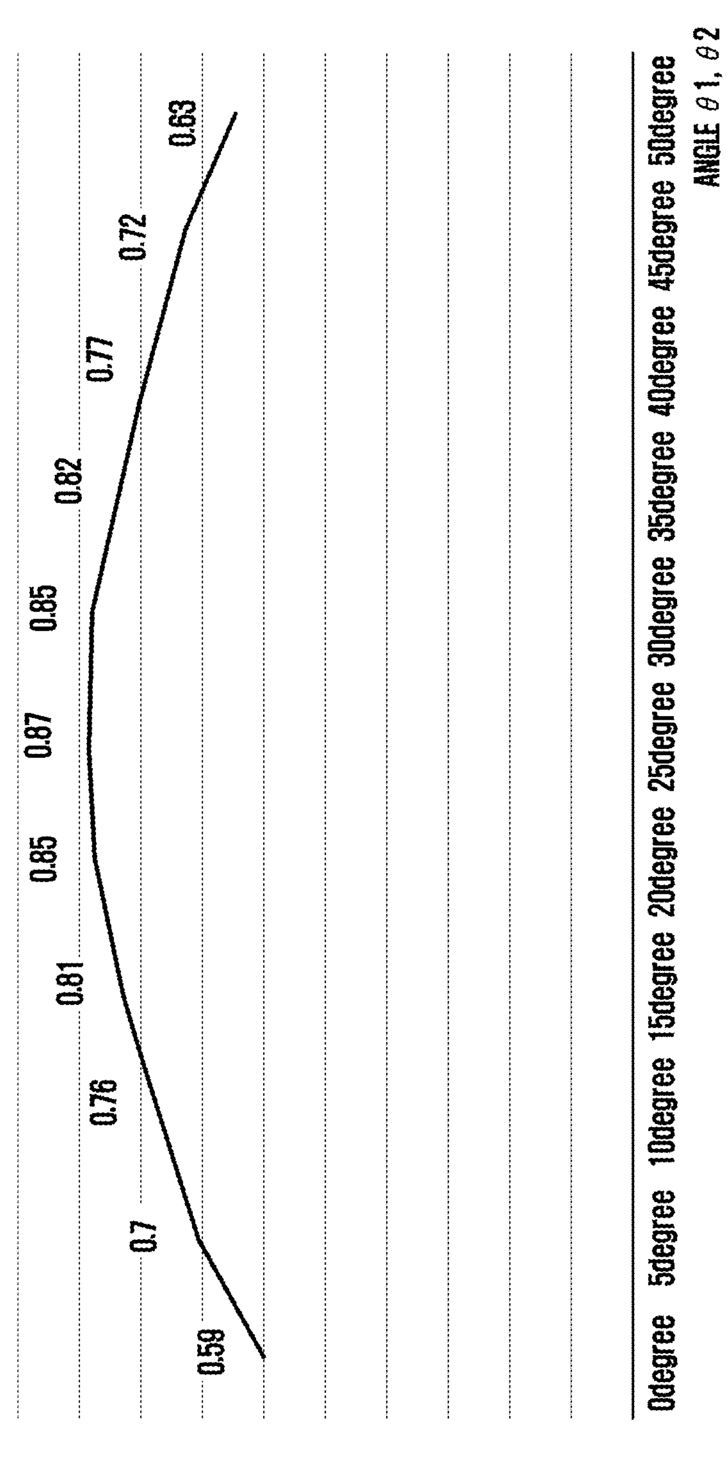
FIG. 4D is a view illustrating the attractive force between the first magnet and the second magnet depending on the angles of the first boundary surface and the second boundary surface of FIG. 4B with respect to the folding axis according to an embodiment of the disclosure.

FIG. 4A is a view illustrating an embodiment in which the first boundary surface of the first magnet and the second boundary surface of the second magnet are parallel to the folding axis according to an embodiment of the disclosure. FIG. 4B is a view illustrating an attractive force between the first magnet and the second magnet depending on the angles at which the first boundary surface of the first magnet and the second boundary surface of the second magnet, which are illustrated in FIG. 3A are tilted with respect to the folding axis according to an embodiment of the disclosure. FIG. 4C is a view illustrating an embodiment in which the first boundary surface of the first magnet is parallel to the folding axis according to an embodiment of the disclosure. FIG. 4D is a view illustrating the attractive force between the first magnet and the second magnet depending on the angles of the first boundary surface and the second boundary surface of FIG. 4B with respect to the folding axis according to an embodiment of the disclosure.

Hereinafter, in FIGS. 4A and 4B, the first magnet 210 arranged in the first housing 110 and the second magnet 220 arranged in the second housing 120 will be described.

In an embodiment, FIG. 4B is a view illustrating the positional relationship between the first magnet 210 and the second magnet 220 illustrated in FIG. 4A. In an embodiment, referring to FIG. 4A, the first magnet 210 and the second magnet 220 may have different shapes.

In an embodiment, referring to FIG. 4B, the first magnet 210 and the second magnet 220 may be arranged not to correspond to each other when the electronic device 100 is in the folded state. For example, the first axis C1 of the first magnet 210 and the second axis C2 of the second magnet 220 may not coincide with each other.

According to an embodiment, as illustrated in FIG. 4B, the first magnet 210 and the second magnet 220 may each include a boundary surface that partitions different poles (e.g., N pole and S pole). For example, the first magnet 210 may include a first boundary surface 211 that partitions the N pole and the S pole. The second magnet 220 may include a second boundary surface 221 that partitions the N pole and the S pole. In an embodiment, as the first magnetic field M1 generated by the first magnet 210 is directed toward the second magnet 220, and the second magnetic field M2 generated by the second magnet 220 is directed to the first magnet 210, the intensity of the attractive force between the first magnet 210 and the second magnet 220 may increase. For example, as the first boundary surface 211 of the first magnet 210 more accurately faces the second magnet 220, the magnetic flux of the first magnetic field M1 generated by the first magnet 210 and passing through the second magnet 220 is increased so that the attractive force between the first magnet 210 and the second magnet 220 may increase. In addition, as the second boundary surface 221 of the second magnet 220 more accurately faces the first magnet 210, the magnetic flux of the second magnetic field M2 generated by the second magnet 220 and passing through the first magnet 210 is increased so that the attractive force between the first magnet 210 and the second magnet 220 may increase.

In an embodiment, as the overlapping area between the first boundary surface 211 and the second boundary surface 221 increases, the overlapping amount between the first magnetic field M1 generated by the first magnet 210 and the second magnetic field M2 generated by the second magnet 220 increases so that the intensity of the attractive force between the first magnet 210 and the second magnet 220 may increase.

In an embodiment, referring to FIG. 4B, the first magnet 210 and the second magnet 220 may be disposed such that the first boundary surface 211 and the second boundary surface 221 face each other. For example, the first magnet 210 may be disposed such that the first boundary surface 211 thereof is tilted at a first angle θ1 with respect to the folding axis F to face the second magnet 220 on the opposite side with respect to the folding axis F. The second magnet 220 may be disposed such that the second boundary surface 221 thereof is tilted at a second angle θ2 with respect to the folding axis F to face the first magnet 210 on the opposite side with respect to the folding axis F. In this case, the first magnetic field M1 generated by the first magnet 210 may be directed toward the second magnet 220, and the second magnetic field M2 generated by the second magnet 220 may be directed toward the first magnet 210. Accordingly, compared to the case where the first boundary surface 211 of the first magnet 210 and/or the second boundary surface 221 of the second magnet 220 are arranged parallel to the folding axis F, the magnetic flux of the first magnetic field M1 generated by the first magnet 210 and passing through toward the second magnet 220 may increase, and the magnetic flux of the second magnetic field M2 generated in the second magnet 220 and passing through the first magnet may increase. Accordingly, the overlapping amount between the first magnetic field M1 of the first magnet 210 and the second magnetic field M2 of the second magnet 220 may increase. Accordingly, the attractive force between the first magnet 210 and the second magnet 220 may increase.

In an embodiment, as the first boundary surface 211 of the first magnet 210 and the second boundary surface 221 the second magnet 220 are tilted at predetermined angles with respect to the folding axis F, the intensity of magnetic field for each position may change. Referring to FIGS. 4B and 4C, the intensity of the magnetic field for each relative position between the first magnet 210 and the second magnet 220 may be identified. In an embodiment, referring to FIG. 4B, for the first magnetic field M1 generated by the first magnet 210, a magnetic field intensity of 50 G may be measured at the first point, a magnetic field intensity of 1100 G may be measured at the second point, and a magnetic field intensity of 300 G may be measured at the third point. For the second magnetic field M2 generated by the second magnet 220, an intensity of 300 G may be measured at the fourth point, a magnetic field intensity of 1100 G may be measure at the fifth point, and a magnetic field intensity of 50 G may be measured at the sixth point. In contrast, referring to FIG. 4C, the first boundary surface 211 of the first magnet 210 may be parallel to the folding axis F, and the second boundary surface 221 of the second magnet 220 may be tilted at the second angle θ2 with respect to the folding axis F toward the 210. In an embodiment, referring to FIG. 4C, for the first magnetic field M1 generated by the first magnet 210, a magnetic field intensity of 100 G may be measured at the first point, a magnetic field intensity of 1200 G may be measured at the second point, and a magnetic field intensity of 100 G may be measured at the third point. For the second magnetic field M2 generated by the second magnet 220, a magnetic field intensity of 300 G may be measured at the fourth point, a magnetic field intensity of 1100 G may be measure at the fifth point, and a magnetic field intensity of 50 G may be measured at the sixth point. The attractive force between the first magnet 210 and the second magnet 220 may be affected by the magnetic field intensity at an adjacent point. For example, referring to FIG. 4B, for the first magnetic field M1 of the first magnet 210, a magnetic field intensity of 300 G may be measured at a third point adjacent to the second magnet 220, and referring to FIG. 4C, for the first magnetic field M1 of the first magnet 210, a magnetic field intensity of 100 G may be measured at a third point adjacent to the second magnet 220. In this case, the attractive force between the first magnet 210 and the second magnet 220 may be greater in the embodiment of FIG. 4B, in which a relatively strong magnetic field intensity is measured at the third point adjacent to the second magnet 220, than in the embodiment of FIG. 4C.

In summary, when the first boundary surface 211 of the first magnet 210 is tilted at the first angle θ1 with respect to the folding axis F to face the second magnet 220 as illustrated in FIG. 4B, the intensity of the first magnetic field M1 measured at the third point adjacent to the second magnet 220 may be increased compared to the case where the first boundary surface 211 is parallel to the folding axis F as illustrated in FIG. 4C. In addition, as illustrated in FIGS. 4B and 4C, when the second boundary surface 221 of the second magnet 220 is tilted at the second angle θ2 with respect to the folding axis F to face the first magnet 210, the intensity of the second magnetic field M2 measured at the fourth point adjacent to the first magnet 210 may be greater than the intensity of the second magnetic field M2 measured at the sixth point spaced apart from the first magnet 210. Accordingly, the boundary surface of the first magnet 210 (e.g., the first boundary surface 211) and/or the boundary surface of the second magnet 220 (e.g., the second boundary surface 221) is arranged to be tilted to face a magnet located on the opposite side with respect to the folding axis F, the intensity of the attractive force between the first magnet 210 and the second magnet 220 may be increased.

The distances of the second point and the third point with respect to the first magnet 210 illustrated in the drawings are only examples and may be modified in various ways. In addition, the distances of the fourth point, the fifth point, and the sixth point with respect to the second magnet 220 are only examples and may be modified in various ways.

In an embodiment, referring to FIG. 4C, when the second boundary surface 221 of the second magnet 220 is tilted at the second angle θ2 with respect to the folding axis F to face the first magnet 210, the intensity of the attractive force between the first magnet 210 and the second magnet 220 may be increased compared to the case where the first boundary surface 211 of the first magnet 210 and the second boundary surface 221 of the second magnet 220 are parallel to the folding axis F. In an embodiment not illustrated in the drawings, when the first boundary surface 211 of the first magnet 210 and the second boundary surface 221 of the second magnet 220 are parallel to the folding axis F, the first magnetic field M1 of the magnet 210 may have an intensity of 100 G at the first point, 1200 G at the second point, and 100 G at the third point, and the second magnetic field M2 of the second magnet 220 may have an intensity of 100 G at the fourth point, an intensity of 1200 G at the fifth point, and an intensity of 100 G at the sixth point. The attractive force between the first magnet 210 and the second magnet 220 may be affected by the magnetic field intensity at an adjacent point. For example, the attractive force between the first magnet 210 and the second magnet 220 may be affected by the magnetic field intensity between the third and fourth points. Therefore, when the second boundary surface of the second magnet 220 is tilted with respect to the folding axis F toward the first magnet 210 as illustrated in FIG. 4C, the intensity of the second magnetic field M2 measured at the fourth point is 300 G. Thus, compared to the case where the first boundary surface 211 of the first magnet 210 and the second boundary surface 221 of the second magnet 220 are parallel to the folding axis F, the intensity of the attractive force between the magnet 210 and the second magnet 220 of FIG. 4C may be increased.

In an embodiment, the graph illustrated in FIG. 4D illustrates the attractive force between the first magnet 210 and the second magnet 220 depending on the first angle θ1 of the first boundary surface 211 of the first magnet 210 tilted with respect to the folding axis F and the second angle θ2 of the second boundary surface 221 of the second magnet 220 tilted with respect to the folding axis F when the first magnet 210 and the second magnet 220 are arranged as illustrated in FIG. 4B. In an embodiment, the first angle θ1 formed by the first boundary surface 211 of the first magnet 210 with respect to the folding angle F may be determined based on the amount of magnetic flux of the first magnetic field M1 passing through the second magnet 220. Similarly, the second angle θ2 formed by the second boundary surface 221 of the second magnet 220 with respect to the folding angle F may be determined based on the amount of magnetic flux of the second magnetic field M2 passing through the first magnet 210. For example, the first angle θ1 of the first magnet 210 with respect to the folding axis F may be determined such that the density of magnetic flux of the first magnetic field M1 passing through the second magnet 220 increases. The second angle θ2 of the second magnet 220 with respect to the folding axis F may be determined such that the density of magnetic flux of the second magnetic field M2 passing through the first magnet 210 increases. In an embodiment, when the first angle θ1 of the first boundary surface 211 of the first magnet 210 and the second angle θ2 of the second boundary surface 221 of the second magnet 220 correspond to about 25 degrees, the maximum attractive force between the first magnet 210 and the second magnet 220 may be 0.87 N. However, the attractive force depending on the angles illustrated in FIG. 4D is only an example, and the maximum attractive force may vary depending on the shapes of the first magnet 210 and the second magnet 220 and the separation distance between the first magnet 210 and the second magnet 220. For example, the first angle θ1 and the second angle θ2 may be different angles.

Figure 5A:
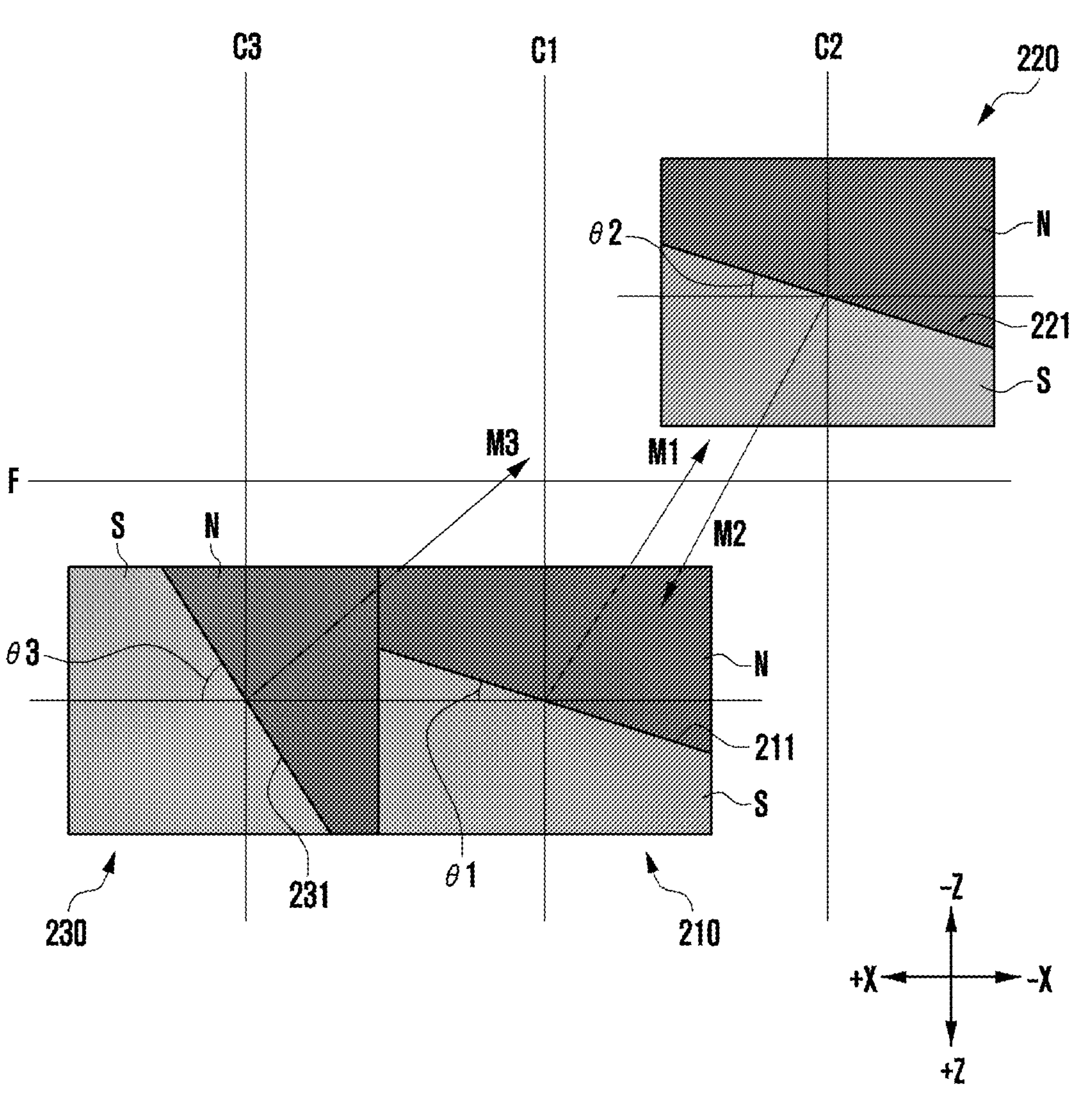
FIG. 5A is a view illustrating a state in which a first magnet and a third magnet arranged in the first housing is arranged not to correspond to a second magnet arranged in the second housing with respect to the folding axis according to an embodiment of the disclosure.
Figure 5B:
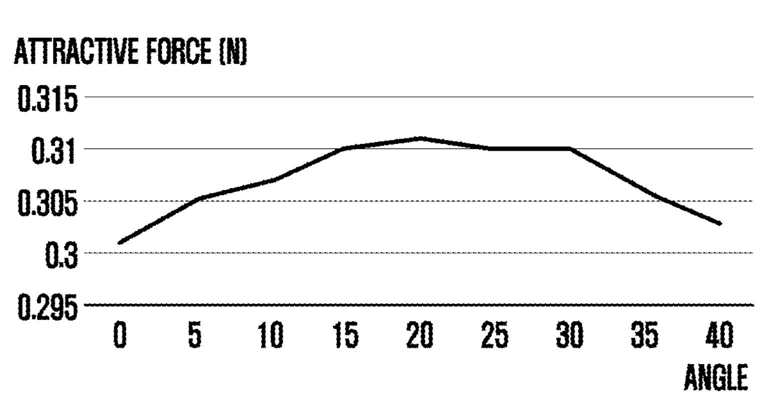
FIGS. 5B, 5C, and 5D are views illustrating attractive forces between the first magnet, the second magnet, and the third magnet depending on a first angle of a first boundary surface of the first magnet tilted with respect to the folding axis, a second angle of a second boundary surface of the second magnet tilted with respect to the folding axis, and a third angle of a third boundary surface of the third magnet tilted with respect to the folding axis, respectively, when the first to third magnets are arranged as illustrated in FIG. 5A according to various embodiments of the disclosure.
Figure 5C:
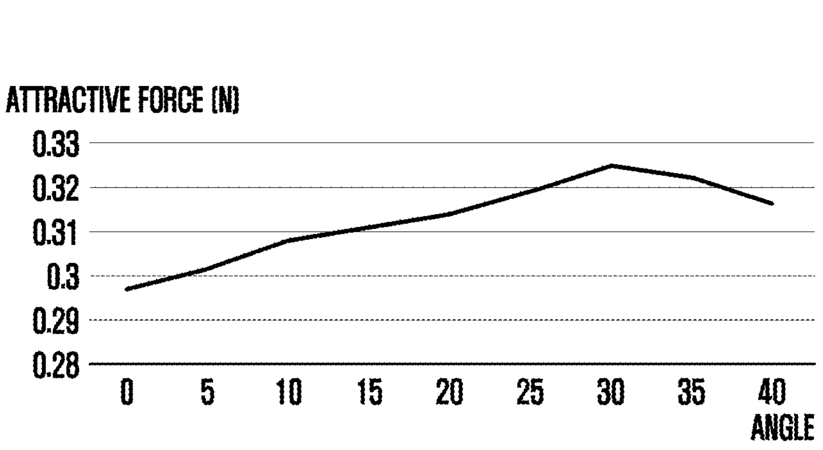
Figure 5D:
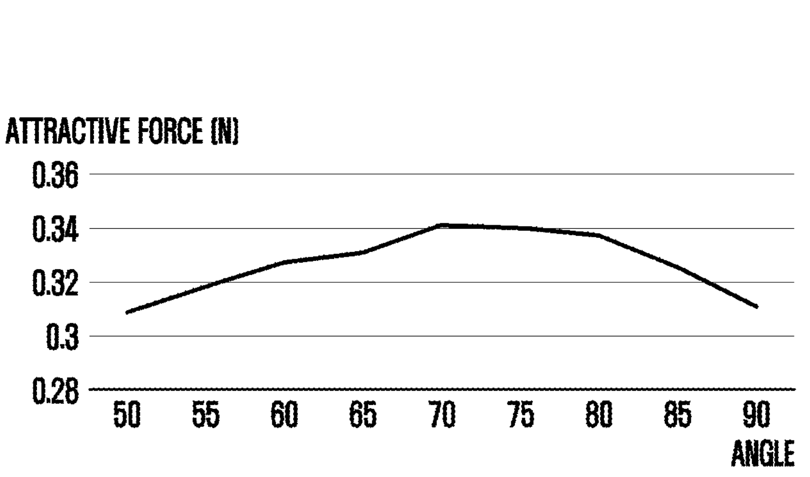

FIG. 5A is a view illustrating a state in which a first magnet and a third magnet arranged in the first housing is arranged not to correspond to a second magnet arranged in the second housing with respect to the folding axis according to an embodiment of the disclosure. FIGS. 5B, 5C, and 5D are views illustrating an attractive force between the first magnet and the third magnet, an attractive force between the third magnet and the second magnet, and an attractive force between the second magnet and the third magnet depending on a first angle of a first boundary surface of the first magnet tilted with respect to the folding axis, a second angle of a second boundary surface of the second magnet tilted with respect to the folding axis, and a third angle of a third boundary surface of the third magnet tilted with respect to the folding axis, respectively, when the first magnet, the second magnet, and the third magnet are arranged as illustrated in FIG. 5A according to various embodiments of the disclosure.

The embodiment to be described below with reference to FIGS. 5A to 5C corresponds to an embodiment in which the third magnet 230 is added to the embodiment described previously with reference to FIGS. 4A to 4D.

According to an embodiment, as illustrated in FIG. 5A, the first housing 110 may include the first magnet 210 and the third magnet 230. The third magnet 230 may be located in a first direction (e.g., the +X direction with respect to FIG. 5A) with respect to the first magnet 210 to be spaced further apart from the second magnet 220 in the first direction than the first magnet 210. Therefore, a third axis C3, which passes through the N and S poles of the third magnet 230 and on which the magnetic flux density of a third magnetic field M3 generated by the third magnet 230 is the highest, may not coincide with a second axis C2 of the second magnet 220.

In an embodiment, the third magnet 230 may include a third boundary surface 231 that partitions the N pole and the S pole. In an embodiment, as the third magnetic field M3 generated by the third magnet 230 is directed toward the second magnet 220, the intensity of the attractive force between the second magnet 220 and the third magnet 230 may increase. In an embodiment, the third magnet 230 may be arranged such that the third boundary surface 231 thereof is tilted at a third angle θ3 with respect to the folding axis F to face the second magnet 220 on the opposite side with respect to the folding axis F. In this case, the third magnetic field M3 generated by the third magnet 230 may be directed toward the second magnet 220. Accordingly, compared to the case where the third boundary surface 231 of the third magnet 230 is arranged in parallel to the folding axis F, the amount of magnetic flux of the third magnetic field M3 generated by the third magnet 230 and passing through the second magnet 220 may increase. Accordingly, the overlapping amount between the second magnetic field M2 of the second magnet 220 and the third magnetic field M3 of the third magnet 230 may increase. Accordingly, the attractive force between the second magnet 220 and the third magnet 230 may increase.

In an embodiment, referring to FIG. 5A, the third magnet 230 may be located in the −X direction compared to the first magnet 210 with respect to the second magnet 220 with reference to FIG. 5A. In this case, the third boundary surface 231 of the third magnet 230 may be tilted more with respect to the folding axis F than the first boundary surface 211 of the first magnet 210 in order to face the second magnet 220. For example, referring to FIGS. 5B and 5D, which will be described later, the third angle θ3 formed by the third boundary surface 231 with the folding axis F may be greater than the first angle θ1 formed by the first boundary surface 211 with the folding axis F.

In an embodiment, referring to FIG. 5A, the second magnet 220 may be influenced by the magnet closer thereto out of the first magnet 210 and the third magnet 230 located on the opposite side with respect to the folding axis F. For example, the second angle θ2 formed by the second boundary surface 221 of the second magnet 220 with the folding axis F may be determined in consideration of the density of magnetic flux passing through the relatively adjacent first magnet 210.

According to an embodiment, at least one of the first angle θ1 formed by the first boundary surface 211 with the folding axis F, the second angle θ2 formed by the second boundary surface 221 with the folding axis F, and the third angle θ3 formed by the third boundary surface 231 with the folding axis F may have a different angle. In an embodiment, each of the boundary surface 211, the second boundary surface 221, and the third boundary surface 231 of the first magnet 210, the second magnet 220, and the third magnet 230 may be tilted with respect to the folding axis F such that the sum of magnetic field thereof with that of a magnet located on the opposite side with respect to the folding axis F is maximized. For example, the first angle θ1 and the third angle θ3 of the first magnet 210 and the third magnet 230 may be determined such that the density of magnetic flux of the first magnetic field M1 and magnetic flux of the third magnetic field M3 passing through the second magnet 220 increases. The second angle θ2 of the second magnet 220 may be determined such that the density of magnetic flux of the second magnetic field M2 passing through the first magnet 210 and the third magnet 230 increases.

According to an embodiment, the graphs illustrated in FIGS. 5B, 5C, and 5D represent data which may be obtained through an experiment of measuring the attractive forces between the first magnet 210, the second magnet 220, and/or the third magnet 230 in the state in which only the boundary surface 211, 221, or 231 of one of the first magnet 210, the second magnet 220, and the third magnet 230 is tilted with respect to the folding axis F, and the boundary surfaces of the remaining two magnets are parallel to the folding axis F.

In an embodiment, the graph illustrated in FIG. 5B may be a graph that illustrates attractive forces between the first magnet 210, the second magnet 220, and the third magnet 230 depending on the first angle θ1 formed by the first boundary surface 211 of the first magnet 210 with the folding axis F in the state in which the second boundary surface 221 of the second magnet 220 and the third boundary surface 231 of the third magnet 230 are parallel to the folding axis F. For example, the graph of FIG. 5B may be a graph illustrating attractive forces between the sum of the magnetic fields formed by the first magnet 210 and the third magnet 230 and the magnetic field on the second magnet 220. In an embodiment, referring to FIG. 5B, in the state in which the second boundary surface 221 of the second magnet 220 and the third boundary surface 231 of the third magnet 230 are parallel to the folding axis F, when the first angle θ1 formed by the first boundary surface 211 of the first magnet 210 with the folding axis F is 20 degrees, the sum of the attractive forces between the first magnet 210, the third magnet 230, and the second magnet 220 may be the maximum of 0.311N.

In an embodiment, the graph illustrated in FIG. 5C may be a graph that illustrates attractive forces between the first magnet 210, the second magnet 220, and the third magnet 230 depending on the second angle θ2 formed by the second boundary surface 221 of the second magnet 220 with the folding axis F in the state in which the first boundary surface 211 of the first magnet 210 and the third boundary surface 231 of the third magnet 230 are parallel to the folding axis F. In an embodiment, referring to FIG. 5C, in the state in which the first boundary surface 211 of the first magnet 210 and the third boundary surface 231 of the third magnet 230 are parallel to the folding axis F, when the second angle θ2 formed by the second boundary surface 221 of the second magnet 220 with the folding axis F is 30 degrees, the sum of the attractive forces between the first magnet 210, the third magnet 230, and the second magnet 220 may be the maximum of 0.325N.

In an embodiment, the graph illustrated in FIG. 5D may be a graph that illustrates attractive forces between the first magnet 210, the second magnet 220, and the third magnet 230 depending on the second angle θ3 formed by the third boundary surface 231 of the third magnet 230 with the folding axis F in the state in which the first boundary surface 211 of the first magnet 210 and the second boundary surface 221 of the second magnet 220 are parallel to the folding axis F. In an embodiment, referring to FIG. 5D, in the state in which the first boundary surface 211 of the first magnet 210 and the second boundary surface 221 of the second magnet 220 are parallel to the folding axis F, when the third angle θ3 formed by the third boundary surface 231 of the third magnet 230 with the folding axis F is 70 degrees, the sum of the attractive forces between the first magnet 210, the third magnet 230, and the second magnet 220 may be the maximum of 0.341N.

In addition, the first boundary surface 211, the second boundary surface 221, and the third boundary surface 231 may be arranged at various angles with respect to the folding axis F such that the attractive force between the first magnet 210, the second magnet 220, and the third magnet 230 is maximized.

Figure 6A:
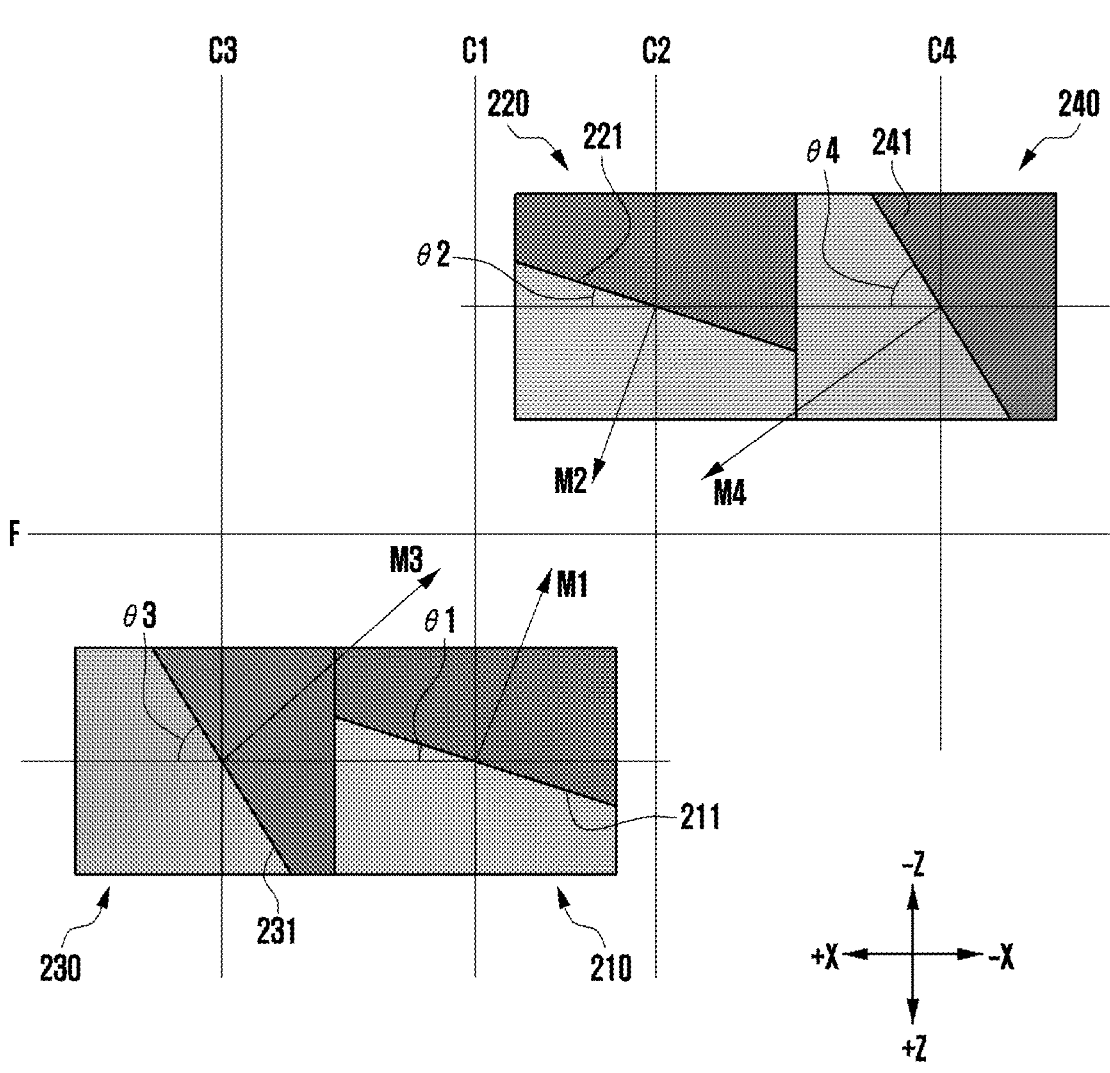
FIG. 6A is a view illustrating a state in which a first magnet and a third magnet arranged in the first housing are arranged not to correspond to a second magnet and a fourth magnet arranged in the second housing with respect to the folding axis according to an embodiment of the disclosure.

FIG. 6A is a view illustrating a state in which a first magnet and a third magnet arranged in the first housing are arranged not to correspond to a second magnet and a fourth magnet arranged in the second housing with respect to the folding axis according to an embodiment of the disclosure. FIGS. 6B, 6C, 6D, and 6E are views illustrating attractive forces between the first magnet and the third magnet and the second magnet and the fourth magnet depending on a first angle of a first boundary surface of the first magnet tilted with respect to the folding axis, a second angle of a second boundary surface of the second magnet tilted with respect to the folding axis, a third angle of a third boundary surface of the third magnet tilted with respect to the folding axis, and a fourth angle of a fourth boundary surface of the fourth magnet tilted with respect to the folding axis, when the first to fourth magnets are arranged as illustrated in FIG. 6A according to various embodiments of the disclosure.

The embodiment to be described below with reference to FIGS. 6A to 6E corresponds to an embodiment in which the fourth magnet 240 is added to the embodiment described previously with reference to FIGS. 5A to 5D.

According to an embodiment, as illustrated in FIG. 6A, the first housing 110 and the second housing 120 may include a plurality of magnets. In an embodiment, the first housing 110 may include the first magnet 210 and the third magnet 230. The second housing 120 may include the second magnet 220 and the fourth magnet 240. In an embodiment, the third magnet 230 may be located in a first direction (e.g., the +X direction with respect to FIG. 6A) with respect to the first magnet 210 to be spaced further apart from the second magnet 220 in the first direction than the first magnet 210. In an embodiment, the fourth magnet 240 may be located in a second direction (e.g., the −X direction with respect to FIG. 6A) with respect to the second magnet 220 to be spaced further apart from the first magnet 210 in the second direction than the second magnet 220. Therefore, a fourth axis C4, which passes through the N and S poles of the fourth magnet 240 and on which the magnetic flux density of a fourth magnetic field M4 generated by the fourth magnet 240 is the highest, may not coincide with a first axis C1 of the first magnet 210 and a third axis C3 of the third magnet 230.

In an embodiment, referring to FIG. 6A, the fourth magnet 240 may include a fourth boundary surface 241 that partitions the N pole and the S pole. In an embodiment, as the amount of magnetic flux of the fourth magnetic field M4 generated by the fourth magnet 240 and passing through the first magnet 210 and the third magnet 230 increases, the attractive force between the first magnet 210 and the magnet 230 may increase. In an embodiment, the fourth magnet 240 may be arranged such that the fourth boundary surface 241 thereof is tilted at a fourth angle θ4 with respect to the folding axis F to face the first magnet 210 and the third magnet 230 located on the opposite side with respect to the folding axis F. In this case, the fourth magnetic field M4 generated by the fourth magnet 240 may be directed toward the first magnet 210 and the third magnet 230. Accordingly, compared to the case where the fourth boundary surface 241 of the fourth magnet 240 is arranged in parallel to the folding axis F, the amount of magnetic flux of the fourth magnetic field M4 generated by the fourth magnet 240 and passing through the first magnet 210 and the second magnet 220 may increase. Accordingly, the overlapping amount between the first magnetic field M1 of the first magnet 210, the third magnetic field M3 of the third magnet 230, and the fourth magnetic field M4 of the fourth magnet 240 may increase. Accordingly, the attractive force between the first magnet 210, the third magnet 230, and the fourth magnet 240 may increase.

In an embodiment, the fourth magnet 240 may be influenced by the magnet closer thereto out of the first magnet 210 and the third magnet 230 located on the opposite side with respect to the folding axis F. For example, the fourth angle θ4 formed by the fourth boundary surface 241 of the fourth magnet 240 with the folding axis F may be determined in consideration of the density of magnetic flux passing through the relatively adjacent first magnet 210.

In an embodiment, referring to FIG. 6A, the fourth magnet 240 may be located in the –X direction compared to the second magnet 220 with respect to the first magnet 210 with reference to FIG. 6A. In this case, the fourth boundary surface 241 of the fourth magnet 240 may be tilted more with respect to the folding axis F than the second boundary surface 221 of the second magnet 220 in order to face the first magnet 210. For example, referring to FIGS. 6C and 6E, which will be described later, the fourth angle θ4 formed by the fourth boundary surface 241 with the folding axis F may be greater than the second angle θ2 formed by the second boundary surface 221 with the folding axis F.

According to an embodiment, at least one of the first angle θ1 formed by the first boundary surface 211 with the folding axis F, the second angle θ2 formed by the second boundary surface 221 with the folding axis F, the third angle θ3 formed by the third boundary surface 231 with the folding axis F, and the fourth angle θ4 formed by the fourth boundary surface 241 with the folding axis F may have a different angle. In an embodiment, each of the boundary surface 211, the second boundary surface 221, the third boundary surface 231, and the fourth boundary surface 241 of the first magnet 210, the second magnet 220, the third magnet 230, and the fourth magnet 240 may be tilted with respect to the folding axis F such that the sum of magnetic field thereof with that of a magnet located on the opposite side with respect to the folding axis F is maximized. For example, the first angle θ1 and the third angle θ3 of the first magnet 210 and the third magnet 230 may be determined based on the amount of magnetic flux passing through the second magnet 220 and the fourth magnet 240 located on opposite sides with respect to the folding axis F. For example, the first angle θ1 and the third angle θ3 of the first magnet 210 and the third magnet 230 may be determined such that the density of magnetic flux of the first magnetic field M1 and magnetic flux of the third magnetic field M3 passing through the second magnet 220 and the fourth magnet 240 increases. Similarly, the second angle θ2 and the fourth angle θ4 of the second magnet 220 and the fourth magnet 240 may be determined based on the amount of magnetic flux passing through the first magnet 210 and the third magnet 230 located on opposite sides with respect to the folding axis F. For example, the second angle θ2 and the fourth angle θ4 of the second magnet 220 and the fourth magnet 240 may be determined such that the density of magnetic flux of the second magnetic field M2 and magnetic flux of the fourth magnetic field M4 passing through the first magnet 210 and the third magnet 230 increases. Meanwhile, for the first magnet 210 and the third magnet 230, the first angle θ1 and the third angle θ3 may be determined based on the magnet closer thereto out of the second magnet 220 and the fourth magnet 240 located on opposite sides with respect to the folding axis F. For example, the first angle θ1 formed by the first boundary surface 211 of the first magnet 210 with the folding axis F and the third angle θ3 formed by the third boundary surface 231 of the third magnet 230 with the folding axis F may be determined in consideration of the magnetic flux of the first magnetic field M1 and the magnetic flux of the third magnetic field M3 passing through the second magnet 220. Similarly, for the second magnet 220 and the fourth magnet 240, the first angle θ2 and the fourth angle θ4 may be determined based on the magnet closer thereto out of the first magnet 210 and the third magnet 230 located on opposite sides with respect to the folding axis F. For example, the second angle θ2 formed by the second boundary surface 221 of the second magnet 220 with the folding axis F and the formed angle θ4 formed by the fourth boundary surface 241 of the fourth magnet 240 with the folding axis F may be determined in consideration of the magnetic flux of the second magnetic field M2 and the magnetic flux of the fourth magnetic field M4 passing through the first magnet 210.

According to an embodiment, the graphs illustrated in FIGS. 6B, 6C, 6D, and 6E represent data which may be obtained through an experiment of measuring the attractive forces between the first magnet 210, the second magnet 220, the third magnet 230, and/or the fourth magnet 240 in the state in which only the boundary surface 211, 221, 231, or 241 of one of the first magnet 210, the second magnet 220, the third magnet 230, and the fourth magnet 240 is tilted with respect to the folding axis F, and the boundary surfaces of the remaining three magnets are parallel to the folding axis F.

Figure 6B:
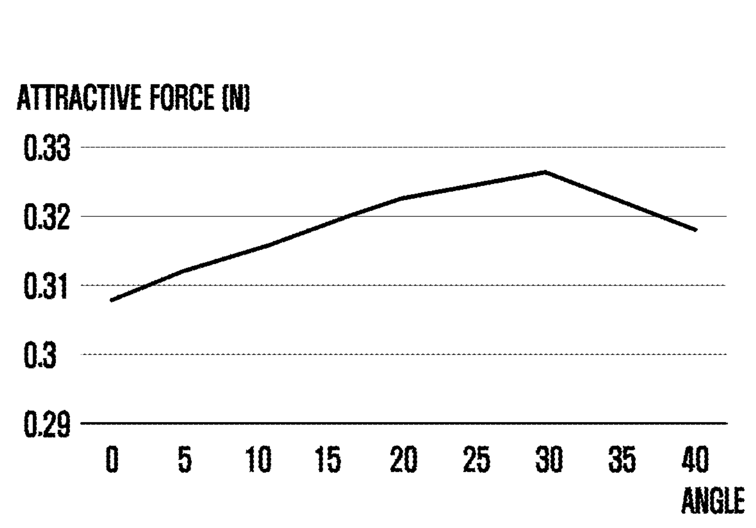
FIGS. 6B, 6C, 6D, and 6E are views illustrating attractive forces between the first magnet and the third magnet and the second magnet and the fourth magnet depending on a first angle of a first boundary surface of the first magnet tilted with respect to the folding axis, a second angle of a second boundary surface of the second magnet tilted with respect to the folding axis, a third angle of a third boundary surface of the third magnet tilted with respect to the folding axis, and a fourth angle of a fourth boundary surface of the fourth magnet tilted with respect to the folding axis, when the first to fourth magnets are arranged as illustrated in FIG. 6A according to various embodiments of the disclosure.

In an embodiment, the graph illustrated in FIG. 6B may be a graph that illustrates attractive forces between the first magnet 210, the second magnet 220, the third magnet 230, and the fourth magnet 240 depending on the first angle θ1 formed by the first boundary surface 211 of the first magnet 210 with the folding axis F in the state in which the second boundary surface 221 of the second magnet 220, the third boundary surface 231 of the third magnet 230, and the fourth boundary surface 241 of the fourth magnet 240 are parallel to the folding axis F. For example, the graph of FIG. 6B may be a graph illustrated the attractive forces by the sum of the magnetic fields formed by the first magnet 210 and the third magnet 230 and the sum of the magnetic fields formed by the second magnet 220 and the fourth magnet 240. In an embodiment, referring to FIG. 6B, in the state in which the second boundary surface 221 of the second magnet 220, the third boundary surface 231 of the third magnet 230, and the fourth boundary surface 241 of the fourth magnet 240 are parallel to the folding axis F, when the first angle θ1 formed by the first boundary surface 211 of the first magnet 210 with the folding axis F is 30 degrees, the sum of the attractive forces between the first magnet 210 and the third magnet 230, and the second magnet 220 and the fourth magnet 240 may be the maximum of 0.326N.

Figure 6C:
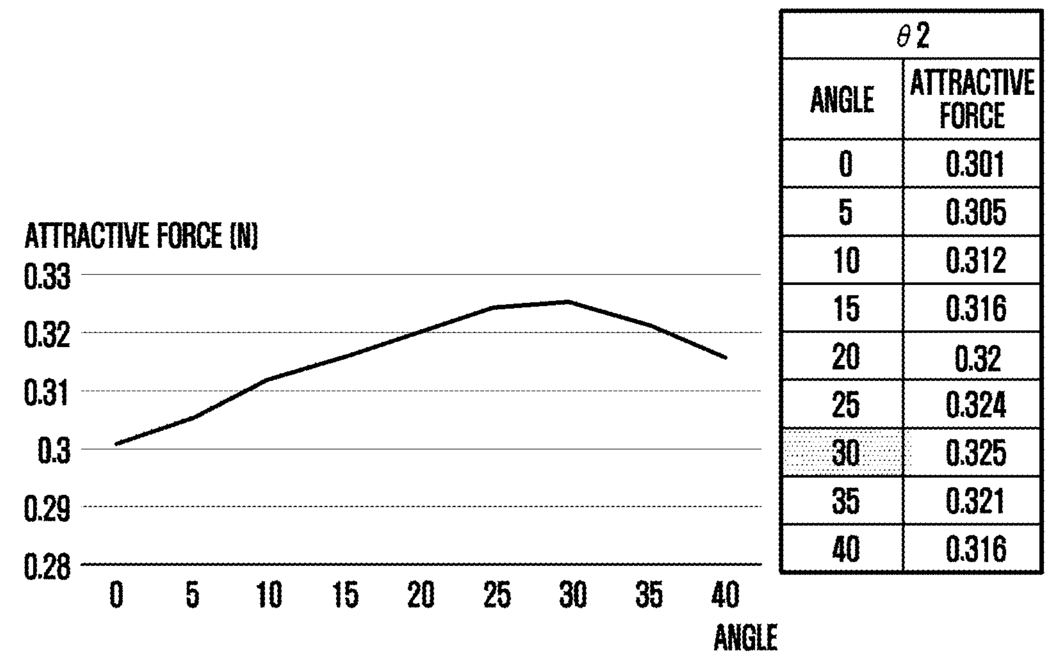

In an embodiment, the graph illustrated in FIG. 6C may be a graph that illustrates attractive forces between the first magnet 210, the second magnet 220, the third magnet 230, and the fourth magnet 240 depending on the second angle θ2 formed by the second boundary surface 221 of the second magnet 220 with the folding axis F in the state in which the first boundary surface 211 of the first magnet 210, the third boundary surface 231 of the third magnet 230, and the fourth boundary surface 241 of the fourth magnet 240 are parallel to the folding axis F. In an embodiment, referring to FIG. 6C, in the state in which the first boundary surface 211 of the first magnet 210, the third boundary surface 231 of the third magnet 230, and the fourth boundary surface 241 of the fourth magnet 240 are parallel to the folding axis F, when the second angle θ2 formed by the second boundary surface 221 of the second magnet 220 with the folding axis F is 30 degrees, the sum of the attractive forces between the first magnet 210 and the third magnet 230, and the second magnet 220 and the fourth magnet 240 may be the maximum of 0.325N.

Figure 6D:
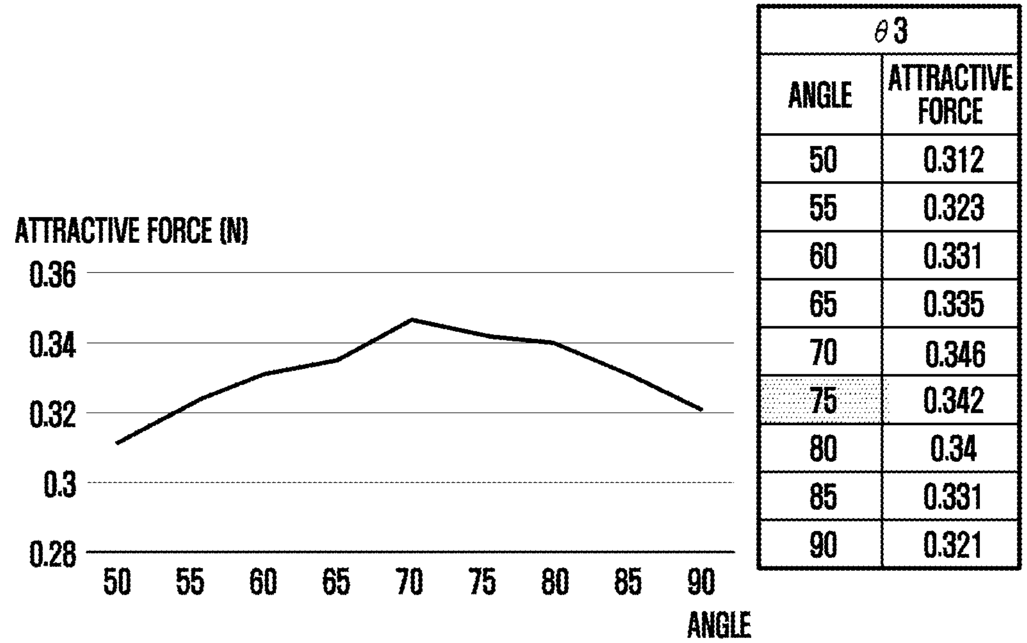

In an embodiment, the graph illustrated in FIG. 6D may be a graph that illustrates attractive forces between the first magnet 210, the second magnet 220, the third magnet 230, and the fourth magnet 240 depending on the third angle θ3 formed by the third boundary surface 231 of the third magnet 230 with the folding axis F in the state in which the first boundary surface 211 of the first magnet 210, the second boundary surface 221 of the second magnet 220, and the fourth boundary surface 241 of the fourth magnet 240 are parallel to the folding axis F. In an embodiment, referring to FIG. 6D, in the state in which the first boundary surface 211 of the first magnet 210, the second boundary surface 221 of the second magnet 220, and the fourth boundary surface 241 of the fourth magnet 240 are parallel to the folding axis F, when the third angle θ3 formed by the third boundary surface 231 of the third magnet 230 with the folding axis F is 75 degrees, the sum of the attractive forces between the first magnet 210 and the third magnet 230, and the second magnet 220 and the fourth magnet 240 may be the maximum of 0.342N.

Figure 6E:
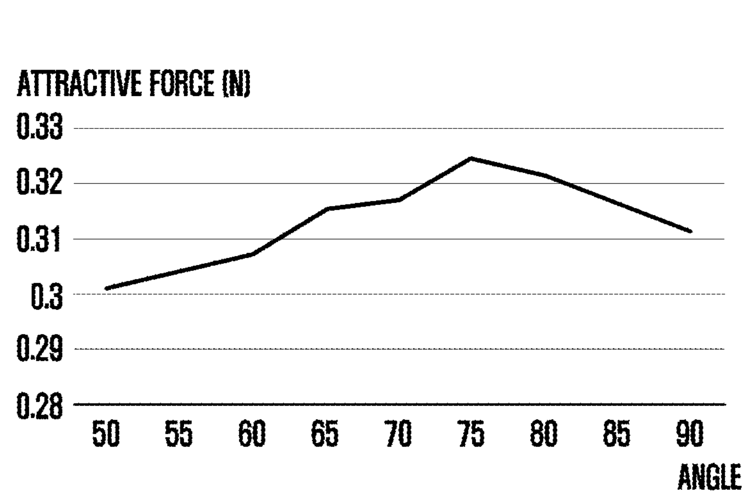

In an embodiment, the graph illustrated in FIG. 6E may be a graph that illustrates attractive forces between the first magnet 210, the second magnet 220, the third magnet 230, and the fourth magnet 240 depending on the fourth angle θ4 formed by the fourth boundary surface 241 of the fourth magnet 240 with the folding axis F in the state in which the first boundary surface 211 of the first magnet 210, the second boundary surface 221 of the second magnet 220, and the third boundary surface 231 of the third magnet 230 are parallel to the folding axis F. In an embodiment, referring to FIG. 6E, in the state in which the first boundary surface 211 of the first magnet 210, the second boundary surface 221 of the second magnet 220, and the third boundary surface 231 of the third magnet 230 are parallel to the folding axis F, when the fourth angle θ4 formed by the fourth boundary surface 241 of the fourth magnet 240 with the folding axis F is 75 degrees, the sum of the attractive forces between the first magnet 210 and the third magnet 230, and the second magnet 220 and the fourth magnet 240 may be the maximum of 0.324N.

In addition, the first boundary surface 211, the second boundary surface 221, the third boundary surface 231, and the fourth boundary surface 241 may be arranged at various angles with respect to the folding axis F such that the attractive force between the first magnet 210, the second magnet 220, the third magnet 230, and the fourth magnet 240 is maximized.

As described above, the boundary surfaces (e.g., the first to fourth boundary surfaces 211, 221, 231 and 241) of the first magnet 210, second magnet 220, third magnet 230, and fourth magnet 240 are used for convenience of described, and the N and S poles of the first to fourth magnets 240 may not be physically separated along the boundary surfaces.

In addition, the boundary surfaces 211, 221, 231, and 241 of the above-described first magnet 210, second magnet 220, third magnet 230, and/or fourth magnet 240 have been described as being tilted at a predetermined angle with respect to the folding axis F, but the boundary surfaces 211, 221, 231, and 241 may not be limited to being tilted based on the folding axis F. In an embodiment, for the first magnet 210 and/or the third magnet 230 arranged in the first housing 110 and the second magnet 220 and/or the fourth magnet 240 arranged in the second housing 120, the boundary surfaces 211, 221, 231, and 241 may be arranged to be tilted with respect to a specific axis such that the attractive force between the magnets located opposite to the folding axis is maximized.

Figure 7A:
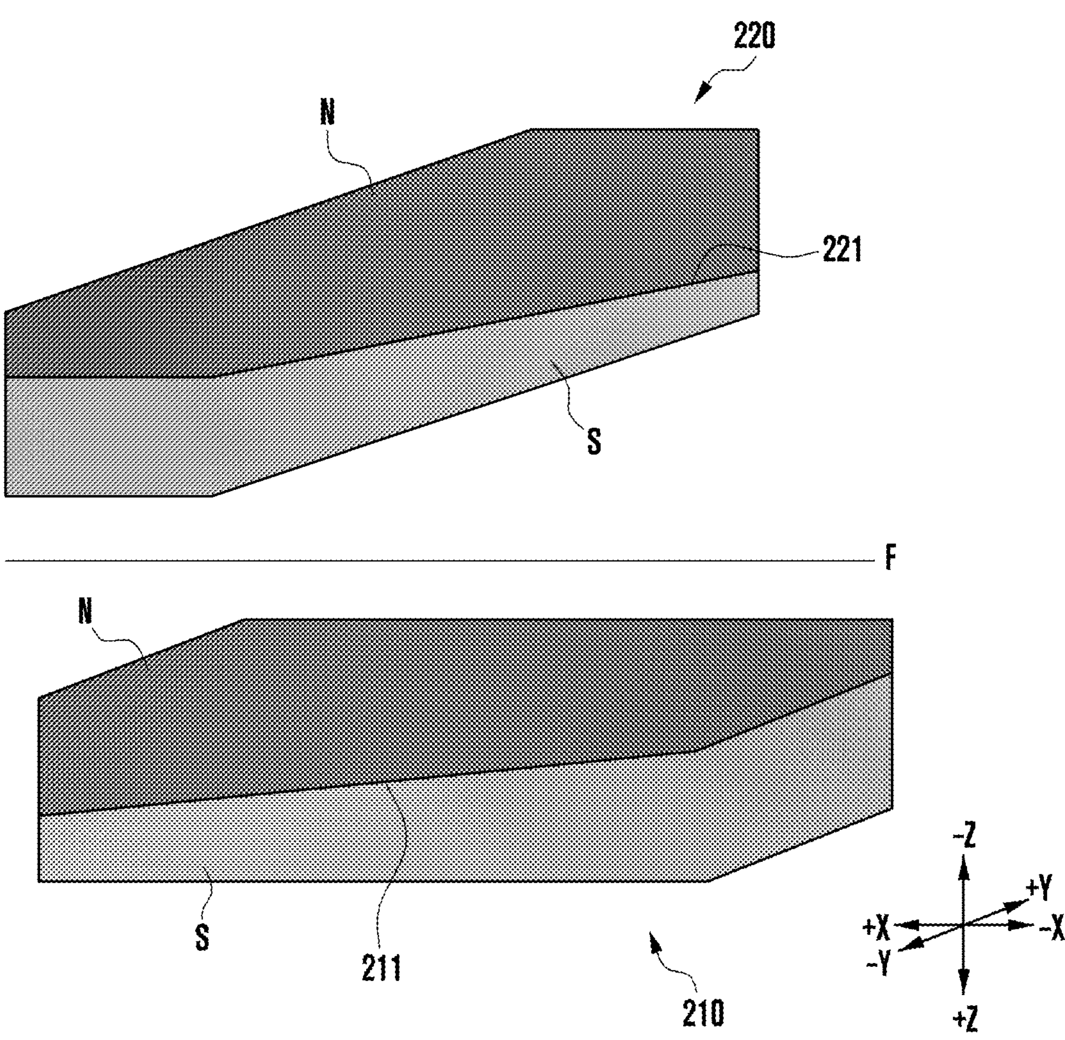
FIG. 7A is a view illustrating an arrangement relationship between a first magnet and a second magnet according to an embodiment of the disclosure.
Figure 7B:
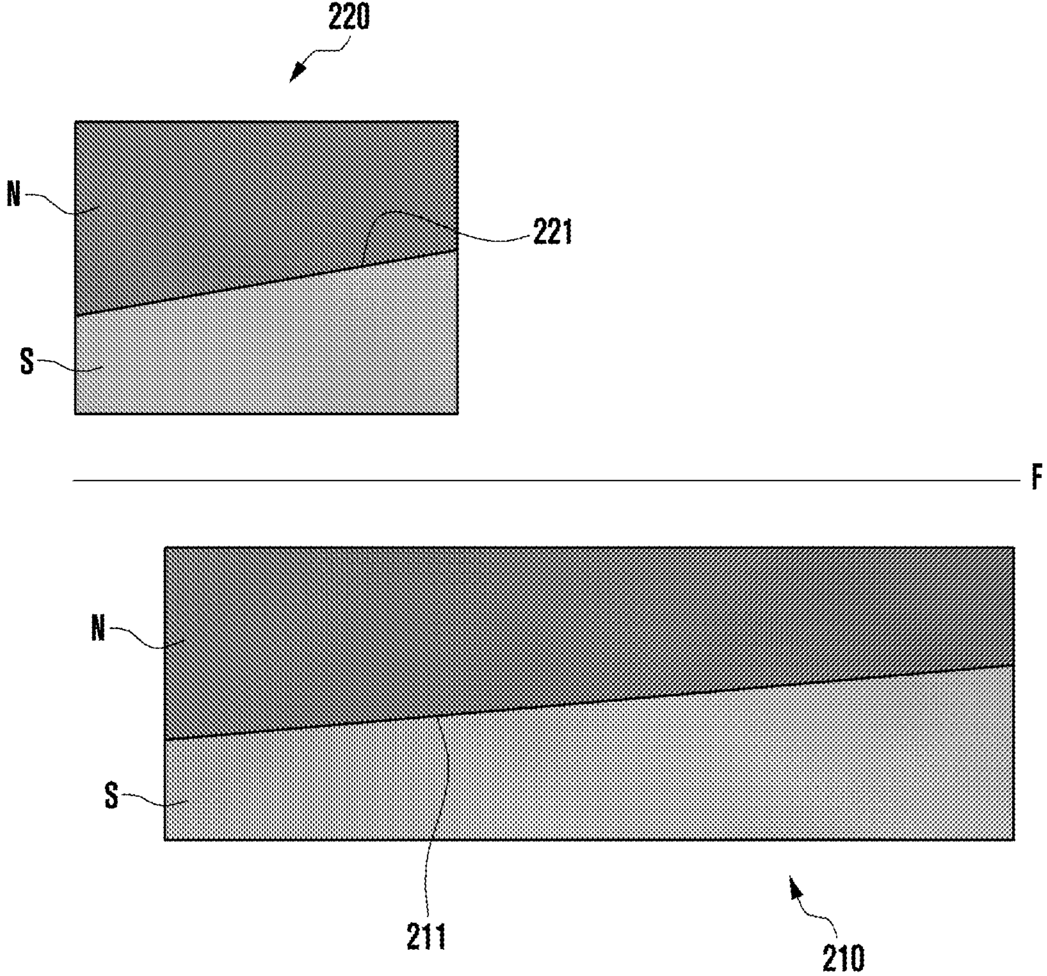
FIG. 7B is a front view of FIG. 7A according to an embodiment of the disclosure.
Figure 7C:
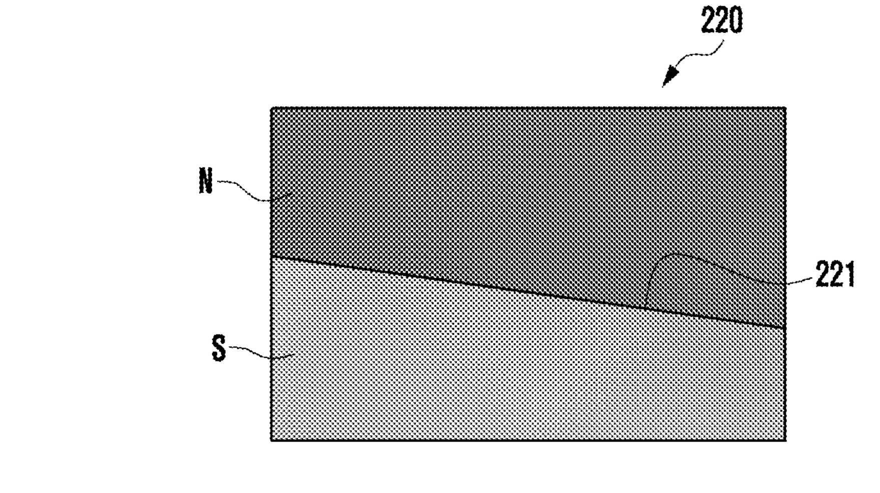
FIG. 7C is a right side view of FIG. 7A according to an embodiment of the disclosure.
Figure 7C:
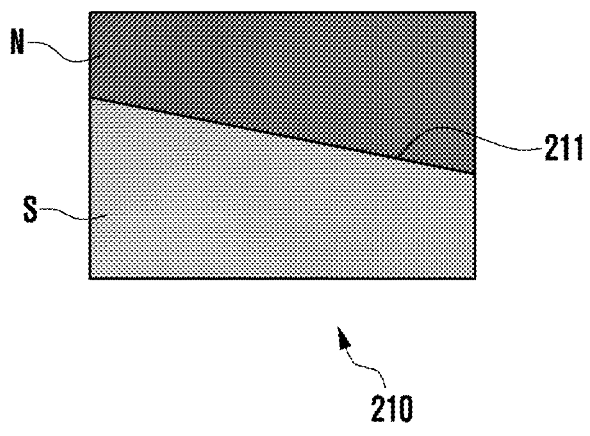

FIG. 7A is a view illustrating various arrangement relationship between a first magnet and a second magnet according to an embodiment of the disclosure. FIG. 7B is a front view of FIG. 7A according to an embodiment of the disclosure. FIG. 7C is a right side view of FIG. 7A according to an embodiment of the disclosure.

According to an embodiment, the relative positions of the first magnet 210 and the second magnet 220 may be changed in various ways. In an embodiment, looking at FIG. 7A, the first magnet 210 and the second magnet 220 may have different extension directions. For example, the first magnet 210 and the second magnet 220 may be arranged in the first housing 110 and the second housing 120, respectively, such that their longitudinal extension directions are perpendicular to each other. In this case, in order to ensure that the attractive force between the first magnet 210 and the second magnet 220 increases, the first boundary surface 211 of the first magnet 210 may be arranged to face the second magnet 220, and the second boundary surface 221 of the second magnet 220 faces the first magnet.

In an embodiment, referring to FIGS. 7A to 7C, when the first magnet 210 and the second magnet 220 illustrated in FIG. 7A are viewed in various directions (e.g., the +X direction or the +Y direction), the first boundary surface 211 and the second boundary surface 221 may be arranged to be tilted to face each other. In an embodiment, FIG. 7B is a front view of the first magnet and the second magnet of FIG. 7A when viewed in the +Y direction in FIG. 7A. In an embodiment, referring to FIG. 7B, the first magnet 210 may be arranged to be tilted with respect to the X-axis in FIG. 7B such that the first boundary surface 211 faces the second magnet 220. The second magnet 220 may be arranged to be tilted with respect to the X-axis in FIG. 7B such that the second boundary surface 221 faces the first magnet 210. In addition, FIG. 7C is a right side view of the first magnet and the second magnet of FIG. 7A when viewed in the +X direction in FIG. 7A. Referring to FIG. 7C, the first magnet 210 may be arranged to be tilted with respect to the X-axis in FIG. 7B such that the first boundary surface 211 faces the second magnet 220. The second magnet 220 may be arranged to be tilted with respect to the X-axis in FIG. 7B such that the second boundary surface 221 faces the first magnet 210. Accordingly, the attractive force of the first magnet 210 and the second magnet 220 may increase since the overlapping amount between the first magnetic field M1 and the second magnetic field M2 increases.

Figure 8:
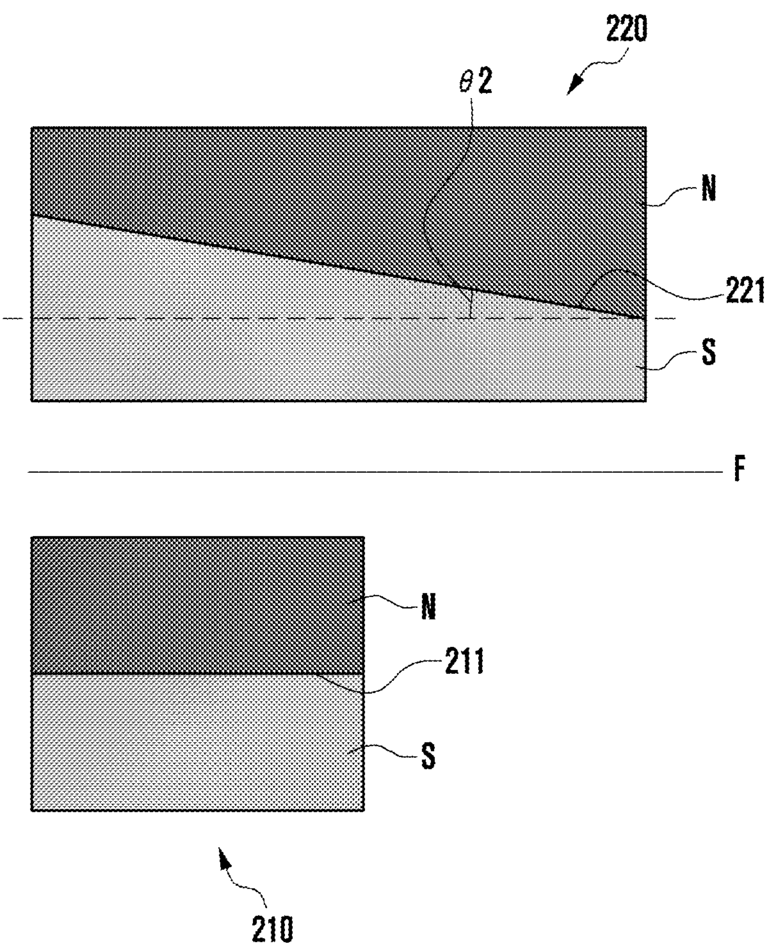
FIG. 8 is a view illustrating an arrangement relationship between a first magnet and a second magnet according to an embodiment of the disclosure.

FIG. 8 is a view illustrating various arrangement relationship between a first magnet and a second magnet according to an embodiment of the disclosure.

According to an embodiment, referring to FIG. 8, the first magnet 210 may have a size included in the second magnet 220. In this case, at least one of a first boundary surface 211 of the first magnet 210 and a second boundary surface 221 of the second magnet 220 may be arranged to face a magnet (e.g., the first magnet 210 and/or the second magnet 220) located on the opposite side with respect to the folding axis F. In an embodiment, referring to FIG. 8, the first boundary surface 211 of the first magnet 210 may be arranged in a direction parallel to the folding axis F, and may have a size included in the second magnet 220. For the second magnet 220, the second boundary surface 221 may be arranged to face the first magnet 210 so that the magnetic flux density of second magnetic field M2 generated by the second magnet 220 increases in a portion overlapping the first magnet 210. For example, the second boundary surface 221 of the second magnet 220 may be tilted at a second angle θ2 with respect to the folding axis F to face the first magnet 210. In an embodiment not illustrated in the drawing, the first boundary surface 211 of the first magnet 210 may be tilted with respect to the folding axis F at a first angle θ1 to face the second boundary surface 221 tilted with respect to the folding axis F. In an embodiment, referring to FIG. 4C described above, when the first boundary surface 211 is tilted with respect to the folding axis F at the first angle θ1 rather than being parallel to the folding axis F, the intensity of the magnetic field of the first magnet 210 may be measured to be high at a third point adjacent to the second magnet 220. Therefore, according to an embodiment of the disclosure, at least one of the first boundary surface 211 of the first magnet 210 and the second boundary surface 221 of the second magnet 220 may be arranged to face a magnet located on the opposite side with respect to the folding axis F. Accordingly, the attractive force of the first magnet 210 and the second magnet 220 may increase since the overlapping amount between the first magnetic field M1 and the second magnetic field M2 increases.

Figure 9A:
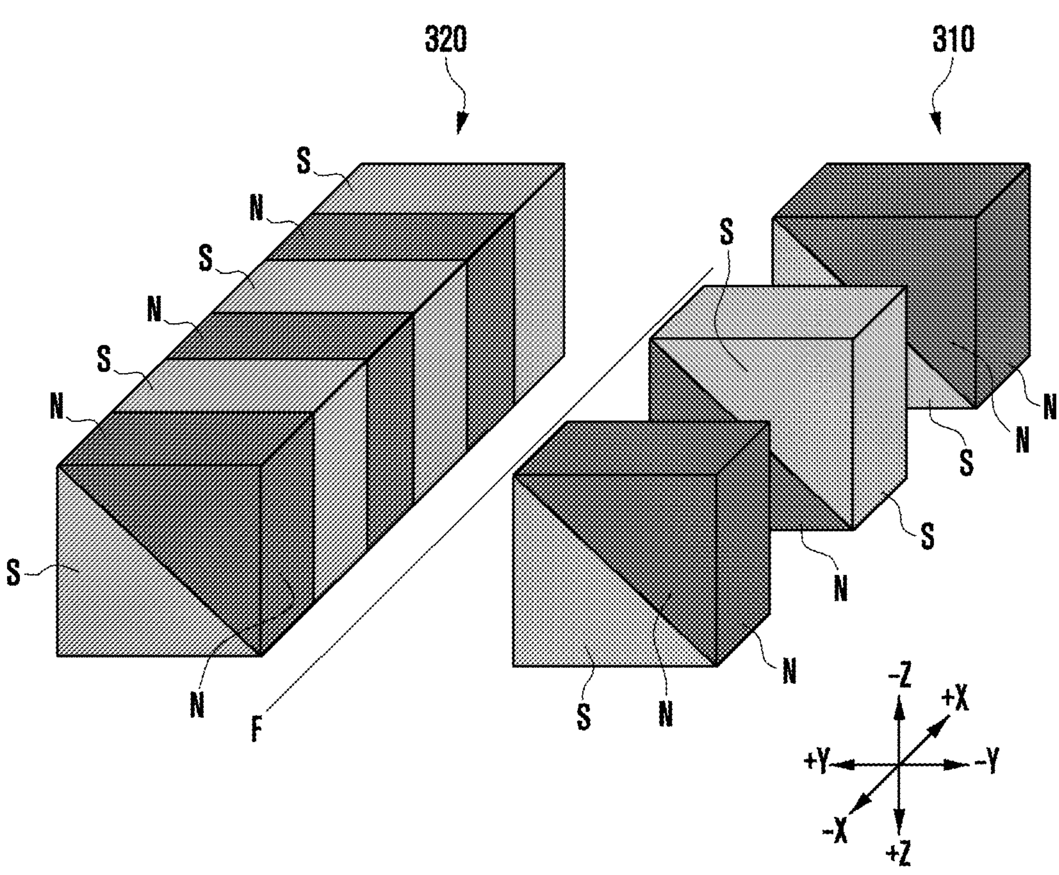
FIGS. 9A and 9B are views illustrating a state in which first magnets and second magnets are arranged in a Halbach array according to various embodiments of the disclosure.
Figure 9B:
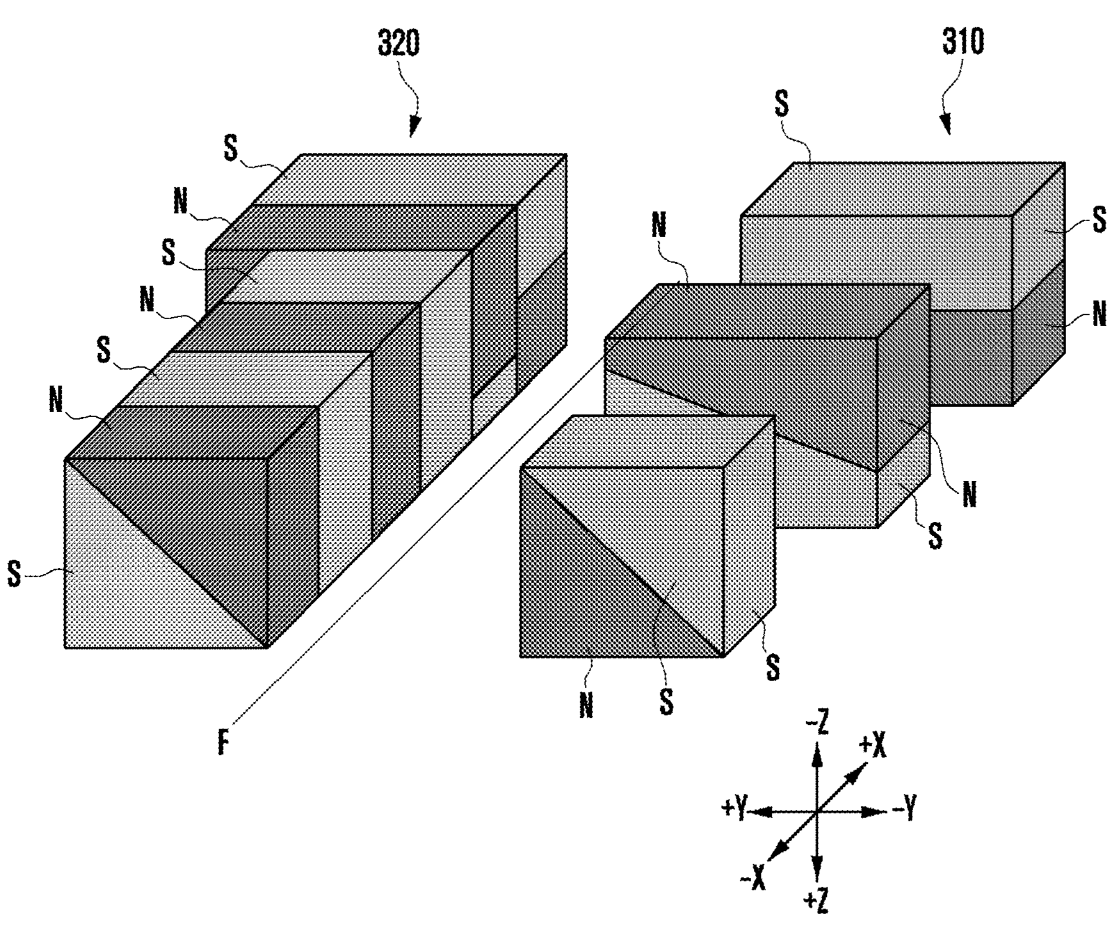

FIGS. 9A and 9B are views illustrating a state in which first magnets and second magnets are arranged in a Halbach array according to various embodiments of the disclosure.

In an embodiment, referring to FIGS. 9A and 9B, the first magnet 310 arranged in the first housing 110 and the second magnet 320 arranged in the second housing 120 may each include a plurality of magnets arranged such that one surfaces thereof facing the display 130 exhibit a plurality of magnetic fields. In an embodiment, referring to FIGS. 9A and 9B, the first magnet 310 may include a plurality of magnets arranged so that N poles and S poles alternate on one surface facing the display 130. For example, the first magnet 310 may include a plurality of magnets arranged in a Halbach array. Similarly, the second magnet 320 may include a plurality of magnets arranged so that N poles and S poles alternate on one surface facing the display 130. For example, the second magnet 320 may include a plurality of magnets arranged in a Halbach array. Hereinafter, for convenience of description, the description will be made on the assumption that the first magnet 310 and the second magnet 320 are magnets with a Halbach array.

According to an embodiment, as illustrated in FIGS. 9A and 9B, the first magnet 310 may be arranged in the first housing 110 such that the plurality of magnets are arranged to face the display 130. The second magnet 320 may be arranged such that the plurality of magnets face the display 130 so that there is an attractive force between the first magnet 310 and the second magnet 320 when the electronic device 100 is in the folded state. According to an embodiment, the plurality of magnets included in the first magnet 310 and the second magnet 320 may have the same size or different sizes.

According to an embodiment, as illustrated in FIGS. 9A and 9B, the plurality of magnets included in the first magnet 310 and the plurality of magnets included in the second magnet 320 may have boundary surfaces, each of which partitions the N pole and the S pole and faces a magnet located on the opposite side with respect to the folding axis F. For example, the plurality of magnets included in the first magnet 310 may be arranged to be tilted with respect to the Y-axis at a predetermined angle with reference to FIG. 9A to face the plurality of magnets included in the second magnet 320 corresponding thereto with respect to the folding axis F. Similarly, the plurality of magnets included in the second magnet 320 may be arranged to be tilted with respect to the Y-axis at a predetermined angle with reference to FIG. 9A to face the plurality of magnets included in the first magnet 310 corresponding thereto with respect to the folding axis F. Accordingly, the overlapping amount between the magnetic fields generated by the plurality of magnets in the first magnet 310 and the second magnet 320 increases so that the attractive force between the first magnet 310 and the second magnet 320 may increase.

In an embodiment not illustrated in the drawings, only one of the first magnet 310 and the second magnet 320 may have a boundary surface arranged to face a magnet (e.g., the first magnet 310 and/or the second magnet 320) located on the opposite side with respect to the folding axis F. In an embodiment, the boundary surfaces of the plurality of magnets included in the first magnet 310 may be parallel to the Y-axis with reference to FIG. 9A, and the boundary surfaces of the plurality of magnets included in the second magnet 320 may be tilted with respect to the Y-axis to face the plurality of magnets included in the first magnet 310. On the contrary, the boundary surfaces of the plurality of magnets included in the first magnet 310 may be arranged to be tilted with respect to the Y axis to face the plurality of magnets included in the second magnet 320, and the boundary surfaces of the plurality of magnets included in the second magnet 320 may be arranged to be parallel to the Y axis. Accordingly, the amount of overlap between the magnetic fields generated by the plurality of magnets increases and the attractive force between the first magnet 310 and the second magnet 320 increases.

According to an embodiment of the disclosure, an electronic device may include a first housing 110, a second housing 120 connected to the first housing to be rotatable about a folding axis F (e.g., the X-axis in FIG. 4A), a display 130 disposed on the front surface of the electronic device and having a partial area of the display deformed by rotation of the second housing relative to the first housing, a first magnets (e.g., the first magnet 210 in FIGS. 4A to 4D, 5A to 5D, 6A to 6E, 7A to 7C, and 8 and/or the first magnet 310 in FIGS. 9A and 9B) arranged in the first housing, and a second magnet (e.g., the second magnet 220 in FIGS. 4A to 4D, 5A to 5D, 6A to 6E, 7A to 7C, and 8 and/or the second magnet 320 in FIGS. 9A and 9B) arranged in the second housing not to correspond to the first magnet while the electronic device is in a folded state, wherein there is an attractive force between the first magnet and the second magnet while the electronic device is in the folded state, wherein the first magnet may include a first boundary surface 211 that partitions different poles and is tilted at a first angle θ1 with respect to the folding axis, wherein the second magnet may include a second boundary surface 221 that partitions different poles and is tilted at a second angle θ2 with respect to the folding axis, and wherein the first boundary surface and the second boundary surface face each other while the electronic device is in the folded state.

In addition, the first magnet and the second magnet may at least partially overlap each other while viewed in a direction perpendicular to the display while the electronic device is in the folded state.

In addition, the first magnet and the second magnet may not overlap each other when viewed in a direction perpendicular to the display while the electronic device is in the folded state.

In addition, a first axis C1 passing through the different poles of the first magnet and perpendicular to the display and a second axis C2 passing through the different poles of the second magnet and perpendicular to the display may not coincide with each other while the electronic device is in the folded state, the intensity of a first magnetic field (M1) generated by the first magnet may become stronger toward the first axis, and the intensity of the second magnetic field (M2) generated by the second magnet may become stronger toward the second axis.

In addition, the first magnet and the second magnet may have different shapes.

Either the first boundary surface or the second boundary surface may be parallel to the folding axis.

In addition, the electronic device may further include a third magnet 230 arranged in in the first housing and located in a first direction with respect to the first magnet, the third magnet including a third boundary surface 231 that partitions different poles and is tilted at a third angle θ3 with respect to the folding axis to face the second boundary surface, wherein there is an attractive force between the second magnet and the third magnet while the electronic device is in the folded state.

In addition, the third angle of the third boundary surface may be greater than the first angle of the first boundary surface.

In addition, one of the first boundary surface, the second boundary surface, and the third boundary surface may be parallel to the folding axis.

In addition, the first angle, the second angle, and the third angle may be tilted with respect to the folding axis such that the attractive force between the first magnet and the second magnet while the electronic device is in the folded state, and the attractive force between the second magnet and the third magnet while the electronic device is in the folded state, are maximized.

In addition, the electronic device may further include a fourth magnet 240 arranged in in the second housing and located in a second direction, which is opposite to the first direction, with respect to the first magnet, the fourth magnet including a fourth boundary surface 241 that partitions different poles and is tilted at a fourth angle θ4 with respect to the folding axis to face the first boundary surface, wherein there is an attractive force between the second magnet and the fourth magnet while the electronic device is in the folded state.

In addition, the fourth angle of the fourth boundary surface may be greater than the second angle of the second boundary surface.

In addition, one of the first boundary surface, the second boundary surface, the third boundary surface, and the fourth boundary surface may be parallel to the folding axis.

In addition, the first angle, the second angle, the third angle, and the fourth angle may be tilted with respect to the folding axis such that the attractive force between the first magnet and the second magnet while the electronic device is in the folded state, the attractive force between the first magnet and the fourth magnet while the electronic device is in the folded state, and the attractive force between the second magnet and the fourth magnet while the electronic device is in the folded state, are maximized.

In addition, the first magnet and the second magnet may each include a plurality of magnets, and the plurality of magnets are arranged in a Halbach array such that a plurality of magnetic fields are exhibited on one surface facing the display, and the first magnet and the second magnet are arranged so that different polarities face each other while the electronic device is in the folded state.

In addition, the first magnet and the second magnet may be arranged in the first housing and the second housing, respectively, to be adjacent to the side surface members (e.g., the first side surface member 113 and or the second side surface member 123 in FIG. 1A) that constitute the side surface exterior of the electronic device.

According to an embodiment of the disclosure, a magnet assembly arranged in an electronic device 100 in which a first housing 110 and a second housing 120 are connected to each other to be rotatable about the folding axis F (e.g., the X-axis in FIG. 4A), the magnet assembly may include a first magnet (e.g., the first magnet 210 in FIGS. 4A to 4D, 5A to 5D, 6A to 6E, 7A to 7C, and 8 and/or the first magnet 310 in FIGS. 9A and 9B) arranged in the first housing, and a second magnet (e.g., the second magnet 220 in FIGS. 4A to 4D, 5A to 5D, 6A to 6E, 7A to 7C, and 8 and/or the second magnet 320 in FIGS. 9A and 9B) arranged in the second housing not to correspond to the first magnet while the electronic device is in a folded state, wherein there is an attractive force between the first magnet and the second magnet while the electronic device is in the folded state, wherein the first magnet may include a first boundary surface 211 that partitions different poles and is tilted at a first angle θ1 with respect to the folding axis, wherein the second magnet may include a second boundary surface 221 that partitions different poles and is tilted at a second angle θ2 with respect to the folding axis, and wherein the first boundary surface and the second boundary surface face each other while the electronic device is in the folded state.

In addition, a first axis C1 passing through the different poles of the first magnet and perpendicular to the display 130 and a second axis C2 passing through the different poles of the second magnet and perpendicular to the display do not coincide with each other while the electronic device is in the folded state, wherein the intensity of a first magnetic field (M1) generated by the first magnet may become stronger toward the first axis, and wherein the intensity of the second magnetic field (M2) generated by the second magnet may become stronger toward the second axis.

In addition, the first magnet and the second magnet may at least partially overlap each other while viewed in a direction perpendicular to the display of the electronic device while the electronic device is in the folded state.

In addition, either the first boundary surface or the second boundary surface may be parallel to the folding axis.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing connected to the first housing to be rotatable about a folding axis;

a display disposed on a front surface of the electronic device and having a partial area of the display deformed by rotation of the second housing relative to the first housing;

a first magnet arranged in the first housing; and a second magnet arranged in the second housing not to correspond to the first magnet while the electronic device is in a folded state, wherein there is an attractive force between the first magnet and the second magnet while the electronic device is in the folded state, wherein the first magnet comprises a first boundary surface that partitions different poles and is tilted at a first angle with respect to the folding axis, wherein the second magnet comprises a second boundary surface that partitions different poles and is tilted at a second angle with respect to the folding axis, and wherein the first boundary surface and the second boundary surface face each other while the electronic device is in the folded state.

2. The electronic device of claim 1, wherein the first magnet and the second magnet at least partially overlap each other while viewed in a direction perpendicular to the display while the electronic device is in the folded state.

3. The electronic device of claim 1, wherein the first magnet and the second magnet do not overlap each other while viewed in a direction perpendicular to the display while the electronic device is in the folded state.

4. The electronic device of claim 1,
wherein a first axis passing through the different poles of the first magnet and perpendicular to the display, and a second axis passing through the different poles of the second magnet and perpendicular to the display, do not coincide with each other while the electronic device is in the folded state,
wherein an intensity of a first magnetic field generated by the first magnet becomes stronger toward the first axis, and
wherein an intensity of a second magnetic field generated by the second magnet becomes stronger toward the second axis.

5. The electronic device of claim 1, wherein the first magnet and the second magnet have different shapes.

6. The electronic device of claim 1, wherein either the first boundary surface or the second boundary surface is parallel to the folding axis.

7. The electronic device of claim 1, further comprising:
a third magnet arranged in in the first housing and located in a first direction with respect to the first magnet, the third magnet comprising:
a third boundary surface that partitions different poles and is tilted at a third angle with respect to the folding axis to face the second boundary surface,
wherein there is an attractive force between the second magnet and the third magnet while the electronic device is in the folded state.

8. The electronic device of claim 7, wherein the third angle of the third boundary surface is greater than the first angle of the first boundary surface.

9. The electronic device of claim 7, wherein one of the first boundary surface, the second boundary surface, and the third boundary surface is parallel to the folding axis.

10. The electronic device of claim 8, wherein the first angle, the second angle, and the third angle are tilted with respect to the folding axis such that the attractive force between the first magnet and the second magnet while the electronic device is in the folded state, and the attractive force between the second magnet and the third magnet while the electronic device is in the folded state, are maximized.

11. The electronic device of claim 8, further comprising:
a fourth magnet arranged in in the second housing and located in a second direction, which is opposite to the first direction, with respect to the first magnet, the fourth magnet comprising:
a fourth boundary surface that partitions different poles and is tilted at a fourth angle with respect to the folding axis to face the first boundary surface,
wherein there is an attractive force between the second magnet and the fourth magnet while the electronic device is in the folded state.

12. The electronic device of claim 11, wherein the fourth angle of the fourth boundary surface is greater than the second angle of the second boundary surface.

13. The electronic device of claim 11, wherein one of the first boundary surface, the second boundary surface, the third boundary surface, and the fourth boundary surface is parallel to the folding axis.

14. The electronic device of claim 11, wherein the first angle, the second angle, the third angle, and the fourth angle are tilted with respect to the folding axis such that the attractive force between the first magnet and the second magnet while the electronic device is in the folded state, the attractive force between the first magnet and the fourth magnet while the electronic device is in the folded state, and the attractive force between the third magnet and the fourth magnet while the electronic device is in the folded state, are maximized.

15. The electronic device of claim 1,
wherein the first magnet and the second magnet each comprises a plurality of magnets, and the plurality of magnets are arranged in a Halbach array such that a plurality of magnetic fields are exhibited on one surface facing the display, and
wherein the first magnet and the second magnet are arranged so that different polarities face each other while the electronic device is in the folded state.

16. The electronic device of claim 1, wherein the first magnet and the second magnet are arranged in the first housing and the second housing, respectively, to be adjacent to side surface members that constitute a side surface exterior of the electronic device.

17. A magnet assembly arranged in an electronic device in which a first housing and a second housing are connected to each other to be rotatable about a folding axis, the magnet assembly comprising:
a first magnet arranged in the first housing; and
a second magnet arranged in the second housing not to correspond to the first magnet while the electronic device is in a folded state,
wherein there is an attractive force between the first magnet and the second magnet while the electronic device is in the folded state,
wherein the first magnet comprises a first boundary surface that partitions different poles and is inclined at a first angle with respect to the folding axis,
wherein the second magnet comprises a second boundary surface that partitions different poles and is inclined at a second angle with respect to the folding axis, and
wherein the first boundary surface and the second boundary surface face each other while the electronic device is in the folded state.

18. The magnet assembly of claim 17,
wherein a first axis passing through the different poles of the first magnet and perpendicular to a display of the electronic device, and a second axis passing through the different poles of the second magnet and perpendicular to the display, do not coincide with each other while the electronic device is in the folded state,
wherein an intensity of a first magnetic field generated by the first magnet becomes stronger toward the first axis, and
wherein an intensity of a second magnetic field generated by the second magnet becomes stronger toward the second axis.

19. The magnet assembly of claim 17, wherein the first magnet and the second magnet at least partially overlap each other while viewed in a direction perpendicular to a display of the electronic device while the electronic device is in the folded state.

20. The magnet assembly of claim 17, wherein either the first boundary surface or the second boundary surface is parallel to the folding axis.

* * * * *